United States Patent
Yamamoto et al.

(10) Patent No.: US 11,502,885 B2
(45) Date of Patent: Nov. 15, 2022

(54) BASE STATION, TERMINAL, RECEPTION METHOD AND TRANSMISSION METHOD

(71) Applicant: Panasonic Intellectual Property Corporation of America, Torrance, CA (US)

(72) Inventors: Tetsuya Yamamoto, Kanagawa (JP); Hidetoshi Suzuki, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

(21) Appl. No.: 17/251,710

(22) PCT Filed: Apr. 4, 2019

(86) PCT No.: PCT/JP2019/014990
§ 371 (c)(1),
(2) Date: Dec. 11, 2020

(87) PCT Pub. No.: WO2020/003682
PCT Pub. Date: Jan. 2, 2020

(65) Prior Publication Data
US 2021/0144037 A1    May 13, 2021

(30) Foreign Application Priority Data
Jun. 25, 2018   (JP) .............................. JP2018-119672

(51) Int. Cl.
*H04L 27/26*    (2006.01)
*H04W 4/70*    (2018.01)
(Continued)

(52) U.S. Cl.
CPC .............. *H04L 27/26* (2013.01); *H04J 11/00* (2013.01); *H04J 99/00* (2022.08); *H04W 4/70* (2018.02); *H04W 88/08* (2013.01)

(58) Field of Classification Search
CPC . H04L 27/26; H04J 11/00; H04J 99/00; H04J 15/00; H04W 4/70; H04W 88/08
See application file for complete search history.

(56) References Cited

U.S. PATENT DOCUMENTS

2017/0230138 A1* 8/2017 Xiong ............... H04W 72/0473
2019/0029031 A1   1/2019 Kumar et al.
2019/0036746 A1* 1/2019 Hwang ............... H04L 27/3444

FOREIGN PATENT DOCUMENTS

WO    2017/139005 A1    8/2017

OTHER PUBLICATIONS

3GPP TS 36.211 V14.3.0, "3$^{rd}$ Generation Partnership Project; Technical Specification Group Radio Access Network; Evolved Universal Terrestrial Radio Access (E-UTRA); Physical channels and modulation (Release 14)," Jun. 2017, 197 pages.
(Continued)

*Primary Examiner* — Shukri Taha
(74) *Attorney, Agent, or Firm* — Seed IP Law Group LLP

(57) ABSTRACT

The present disclosure provides a base station capable of improving the frequency utilization efficiency in uplink. In the base station (100), a receiver (112) receives a transmission signal to be repeatedly transmitted over a plurality of allocation units, and a reception signal processor (114) demodulates the transmission signal based on a combination of non-orthogonal multiple access where signals of a plurality of terminals are not orthogonal with each other, and orthogonal multiple access where signals of a plurality of terminals are orthogonal with each other.

13 Claims, 20 Drawing Sheets

(51) Int. Cl.
*H04J 11/00* (2006.01)
*H04W 88/08* (2009.01)

(56) References Cited

OTHER PUBLICATIONS

3GPP TS 36.212 V14.3.0, "3rd Generation Partnership Project; Technical Specification Group Radio Access Network; Evolved Universal Terrestrial Radio Access (E-UTRA); Multiplexing and channel coding (Release 14)," Jun. 2017, 198 pages.
3GPP TS 36.213 V14.3.0, "3rd Generation Partnership Project; Technical Specification Group Radio Access Network; Evolved Universal Terrestrial Radio Access (E-UTRA); Physical layer procedures (Release 14)," Jun. 2017, 460 pages.
Chen et al., "Multi-User Proportional Fair Scheduling for Uplink Non-orthogonal Multiple Access (NOMA)," DOCOMO Beijing Communications Laboratories Co., Ltd., IEEE, 2014, 5 pages.
Dai et al., "Non-Orthogonal Multiple Access for 5G: Solutions, Challenges, Opportunities, and Future Research Trends," *IEEE Communications Magazine*, Sep. 2015, pp. 74-81. (8 pages).
Ericsson, "Interim conclusions on IoT for Rel-16," Rp-180581, Agenda item: 9.1.1, 3GPP TSG RAN Meeting #79, Chennai, India, Mar. 19-22, 2018, 2 pages.
ETRI, "Low code rate and signature based multiple access scheme for New Radio," R1-164869, Agenda Item: 7.1.3.2, 3GPP TSG-RAN1#85, Nanjing, China, May 23-27, 2016, 4 pages.
Fujitsu, "Initial LLS results for UL non-orthogonal multiple access," R1-164329, Agenda Item: 7.1.3.2, 3GPP TSG RAN WG1 Meeting #85, Nanjing, China, May 23-27, 2016, 9 pages.
Intel Corporation, "Multiple access schemes for new radio interference," R1-162385, Agenda item: 8.1.4.2, 3GPP TSG RAN WG1 Meeting #84bis, Busan, South Korea, Apr. 11-15, 2016, 4 pages.
International Search Report, dated Jun. 11, 2019, for International Application No. PCT/JP2019/014990, 2 pages. (with English translation).
Kang et al., "Pattern division multiple access for 5G," *Telecommunications Network Technology* 5(5), May 2015, pp. 43-47. (6 pages; with English abstract).
Kusume et al., "IDMA vs. CDMA: Analysis and Comparison of Two Multiple Access Schemes," *IEEE Transactions on Wireless Communications* 11(1), Jan. 2012, pp. 78-87. (10 pages).
LG Electronics, "Considerations on DL/UL multiple access for NR," R1-162517, Agenda Item: 8.1.4.2, 3GPP TSG RAN WG1 Meeting #84bis, Busan, South Korea, Apr. 11-15, 2016, 4 pages.
MediaTek Inc., "New uplink non-orthogonal multiple access schemes for NR," R1-167535, Agenda item: 8.1.2.2, 3GPP TSG RAN WG1 Meeting #86, Gothenburg, Sweden, Aug. 22-26, 2016, 6 pages.
Nikopour et al., "Sparse Code Multiple Access," Huawei Technologies Canada Co., LTD., Ontario, Canada, 2013 IEEE 24th International Symposium on Personal, Indoor and Mobile Radio Communications: Fundamentals and PHY Track, pp. 332-336. (5 pages).
Nokia, Alcatel-Lucent Shanghai Bell, "Non-orthogonal multiple access for New Radio," R1-165019, Agenda item: 7.1.3.2, 3GPP TSG-RAN WG1#85, Nanjing, China, May 23-27, 2016, 6 pages.
Qualcomm Incorporated, "Candidate NR Multiple Access Schemes," R1-162202, Agenda Item: 8.1.4.2, 3GPP TSG-RAN WG1 #84b, Busan, South Korea, Apr. 11-15, 2016, 8 pages.
Samsung, "Non-Orthogonal Multiple Access Considerations for NR," R1-163993, Agenda item: 7.1.3.2, 3GPP TSG RAN WG1 #85, Nanjing, China, May 23-27, 2016, 4 pages.
Yuan et al., "Multi-User Shared Access for 5G Wireless Networks," *Telecommunications Network Technology* 5(5), May 2015, pp. 28-31. (5 pages; with English abstract).
Zte, "Revision of Study on 5G Non-orthogonal Multiple Access," RP-171043, Agenda Item: 9.3.4, 3GPP TSG RAN Meeting #76, West Palm Beach, USA, Jun. 5-8, 2017, 5 pages.

\* cited by examiner

BASE STATION, TERMINAL, RECEPTION METHOD AND TRANSMISSION METHOD

TECHNICAL FIELD

The present disclosure relates to a base station, a terminal, a reception method, and a transmission method.

BACKGROUND ART

Machine Type Communication (MTC) and Narrow Band IoT (NB-IoT) have been specified as a Long Term Evolution (LTE) radio interface assuming Low Power Wide Area (LPWA) use cases with Internet of Things (IoT) by Release 15 in the 3rd Generation Partnership Project (3GPP). MTC and NB-IoT mainly support functions to enable, for example, lower cost, lower power, and coverage enhancement of terminals (may be referred to as User Equipment (UE)) (see, for example, Non-Patent Literatures 1 to 3).

In the 5th Generation mobile communication systems (5G), which has currently been specified, massive MTC (mMTC) is one of the major use cases as well as enhanced Mobile Broadband (eMBB) and Ultra Reliable Low Latency Communication (URLLC). The mMTC has a scenario of improving the frequency utilization efficiency and supporting simultaneous connections of a large number of terminals.

CITATION LIST

Non-Patent Literature

NPL 1
3GPP TS 36.211, "Evolved Universal Terrestrial Radio Access (E-UTRA); Physical channels and modulation (Release 14)," V14.3.0, June 2017.
NPL 2
3GPP TS 36.212, "Evolved Universal Terrestrial Radio Access (E-UTRA); Multiplexing and channel coding (Release 14)," V14.3.0, June 2017.
NPL 3
3GPP TS 36.213, "Evolved Universal Terrestrial Radio Access (E-UTRA); Physical layer procedure for control (Release 14)," V14.3.0, June 2017.
NPL 4
RP-171043, "Revision of Study on 5G Non-orthogonal Multiple Access," ZTE, RAN #76, June 2017.
NPL 5
RP-180581, "Interim conclusions on IoT for Rel-16," Ericsson, RAN #79, March 2018.
NPL 6
L. Dai, B. Wang, Y. Yuan, S. Han. C. L. I, Z. Wang, "Non-orthogonal multiple access for 5G: solutions, challenges, opportunities, and future research trends," IEEE Communications Magazine, Vol. 53, No. 9, September 2015.
NPL 7
X. Chen, A. Benjebbour, A. Li. and A. Harada, "Multi-user proportional fair scheduling for uplink non-orthogonal multiple access (NOMA)," Proc. IEEE Vehicular Technology Conference (IEEE VTC 2014 Fall), May 2014.
NPL 8
H. Nikopour and H. Baligh, "Sparse code multiple access," Proc. IEEE 24th International Symposium on Personal Indoor and Mobile Radio Communications (IEEE PIMRC 2013), September 2013.
NPL 9
Z. Yuan, G. Yu, and W. Li, "Multi-user shared access for 5G," Telecommunications Network Technology," Vol. 5, No. 5, May 2015.
NPL 10
S. Kang, X. Dai, and B. Ren, "Pattern division multiple access for 5G," Telecommunications Network Technology, Vol. 5, No. 5, May 2015.
NPL 11
R1-164869, "Low code rate and signature based multiple access scheme for New Radio," ETRI, RAN1 #85, May 2016.
NPL 12
R1-162202, "Candidate NR multiple access schemes," Qualcomm, RAN1 #84bis, April 2016.
NPL 13
R1-163993, "Non-orthogonal multiple access considerations for NR," Samsung, RAN1 #85, May 2016.
NPL 14
K. Kusume, G. Bauch, and W. Utschick, "IDMA vs. CDMA: Analysis and comparison of two multiple access schemes," IEEE Trans. Wireless Commun., Vol. 11, No. 1, January 2012.
NPL 15
R1-162517, "Considerations on DL/UL multiple access for NR," LG Electronics, RAN1 #84bis, April 2016.
NPL 16
R1-165019, "Non-orthogonal multiple access for New Radio," Nokia, Alcatel-Lucent Shanghai Bell, RAN1 #85, May 2016.
NPL 17
R1-167535, "New uplink non-orthogonal multiple access schemes for NR," MediaTek, RAN1 #86, August 2016.
NPL 18
R1-164329, "Initial LLS results for UL non-orthogonal multiple access," Fujitsu, RAN1 #85, May 2016.
NPL 19
R1-162385, "Multiple access schemes for new radio interface," Intel, RAN1 #84bis, April 2016.

SUMMARY OF INVENTION

Further studies need to be carried out on a method of improving the frequency utilization efficiency in uplink.

Non-limiting embodiments of the present disclosure facilitate providing a base station, a terminal, a reception method, and a transmission method each capable of improving the frequency utilization efficiency in uplink.

A base station according to one aspect of the present disclosure includes: a receiver, which in operation, receives a transmission signal to be repeatedly transmitted over a plurality of allocation units; and circuitry, which, in operation, demodulates the transmission signal based on a combination of non-orthogonal multiple access where signals of a plurality of terminals are not orthogonal with each other, and orthogonal multiple access where signals of a plurality of terminals are orthogonal with each other.

A terminal according to one aspect of the present disclosure includes: circuitry, which, in operation, generates a transmission signal to be repeatedly transmitted over a plurality of allocation units based on a combination of non-orthogonal multiple access where signals of a plurality of terminals are not orthogonal with each other, and orthogonal multiple access where signals of a plurality of terminals are orthogonal with each other; and a transmitter, which in operation, transmits the transmission signal.

A reception method according to one aspect of the present disclosure includes: receiving a transmission signal to be repeatedly transmitted over a plurality of allocation units; and demodulating the transmission signal based on a combination of non-orthogonal multiple access where signals of a plurality of terminals are not orthogonal with each other, and orthogonal multiple access where signals of a plurality of terminals are orthogonal with each other.

A transmission method according to one aspect of the present disclosure includes: generating a transmission signal to be repeatedly transmitted over a plurality of allocation units based on a combination of non-orthogonal multiple access where signals of a plurality of terminals are not orthogonal with each other, and orthogonal multiple access where signals of a plurality of terminals are orthogonal with each other; and transmitting the transmission signal.

It should be noted that general or specific embodiments may be implemented as a system, an apparatus, a method, an integrated circuit, a computer program or a recording medium, or any selective combination of the system, the apparatus, the method, the integrated circuit, the computer program, and the recording medium.

An exemplary embodiment of the present disclosure enables to improve the frequency utilization efficiency in uplink.

Additional benefits and advantages of the disclosed exemplary embodiments will become apparent from the specification and drawings. The benefits and/or advantages may be individually obtained by various embodiments and features of the specification and drawings, which need not all be provided in order to obtain one or more of such benefits and/or advantages.

DESCRIPTION OF EMBODIMENTS

Figure 1:
FIG. 1 is a block diagram illustrating a configuration of a part of a base station according to Embodiment 1.

Hereinafter, a detailed description will be given of embodiments of the present disclosure with reference to the accompanying drawings.

In the Study Item of New Radio access technology (NR) radio interface in 3GPP, Non-Orthogonal Multiple Access (NOMA), for example, has been studied in order to improve the frequency utilization efficiency for mMTC (see, for example, NPL 4). NOMA performs overloaded multiplex transmission by transmitting more signals than the number of radio resources in multiple access.

In addition, the enhancement of radio interfaces for LPWA use cases will continue to be studied in 3GPP Release 16, not NR based but MTC and NB-IoT based (see, for example, NPL 5).

LTE MTC and NB-IoT radio interfaces support a Repetition function as a coverage enhancement function. In the Repetition, the same signals are repeatedly transmitted, and the signals are combined on the receiving side. This improves the Signal to Noise power Ratio (SNR), and thus enhances the coverage. The Repetition needs multiple radio resources (e.g., multiple slots or subframes) for the transmission of the same signals, thereby deteriorating the frequency utilization efficiency.

The application of the non-orthogonal multiple access, which is studied for NR, to LTE MTC and NB-IoT improves the frequency utilization efficiency in uplink.

The non-orthogonal multiple access that is studied for NR assumes, however, a radio resource allocation in a single slot or a single subframe. In other words, the non-orthogonal multiple access in NR does not assume the Repetition that is supported in LTE MTC and NB-IoT as a basic function, that is, a radio resource allocation to multiple slots or subframes is not assumed in the non-orthogonal multiple access in NR.

In this regard, a conceivable method to implement the non-orthogonal multiple access while applying the Repetition is to simply enhance the size of a Signature (e.g., a spread code or a code book), which generates a signal for the non-orthogonal multiple access, from a single slot to multiple slots. In this method, however, the size of the Signature increases as the number of Repetitions (e.g., the number of slots) increases. This causes a risk of significantly increasing the computational complexity of user detection, demodulation processing, or the like on the receiving side.

Description will be given, as an example, of a case of multiplexing maximum U terminals using X radio resources (e.g., Resource Elements (REs)) for the non-orthogonal multiple access in a single slot allocation. On the assumption of applying Message Passing Algorithm (VIPA) to user detection processing, for example, the factor graph matrix size to perform MPA is represented by X×U. In the case of simply enhancing the radio resources for the non-orthogonal multiple access by multiple slots while applying the Repetition, the number of which (also referred to as a Repetition size or a Repetition factor) is indicated by R, for example, the factor graph matrix size to perform MPA is represented by R (X×U). In this case, the number of the multiplexed terminals improves R times although the frequency utilization efficiency decreases to 1/R due to the Repetition, and the number of the multiplexed terminals per radio resource will be U/X as a whole, whereby no deterioration of the frequency utilization efficiency occurs. The computational complexity of MPA exponentially increases, however, as the number of the multiplexed terminals increases.

Additionally, not only in MPA but also in user detection in the non-orthogonal multiple access, the computational complexity greatly increases in general as the number of the multiplexed terminals increases (see, for example PTL 6). Thus, there is a limit in preventing the deterioration of the frequency utilization efficiency due to the Repetition by increasing the size of the Signature while applying the Repetition, and increasing the number of the multiplexed terminals.

One embodiment of the present disclosure thus explains a method for improving the frequency utilization efficiency while avoiding the increase in the computational complexity of user detection, demodulation processing, or the like on the receiving side, when the Repetition is applied.

Embodiment 1

[Overview of Communication System]

The communication system according to the present embodiment includes base station 100 and terminal 200.

FIG. 1 is a block diagram illustrating a configuration of a part of base station 100 according to the present embodiment. In base station 100 illustrated in FIG. 1, receiver 112 receives a transmission signal to be repeatedly transmitted over multiple allocation units (e.g., slots), and received signal processor 114 demodulates the transmission signal based on the combination of non-orthogonal multiple access, where signals of a plurality of terminals are not orthogonal with each other, and orthogonal multiple access, where signals of a plurality of terminals are orthogonal with each other.

Figure 2:
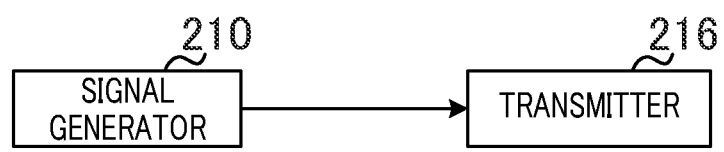
FIG. 2 is a block diagram illustrating a configuration of a part of a terminal according to Embodiment 1.

FIG. 2 is a block diagram illustrating a configuration of a part of terminal 200 according to the present embodiment. In terminal 200 illustrated in FIG. 2, signal generator 210 generates a transmission signal to be repeatedly transmitted over multiple allocation units (e.g., slots), based on the combination of the non-orthogonal multiple access, where signals of a plurality of terminals are not orthogonal with each other, and the orthogonal multiple access, where signals of a plurality of terminals are orthogonal with each other, and transmitter 216 transmits the transmission signal.

[Configuration of Base Station]

Figure 3:
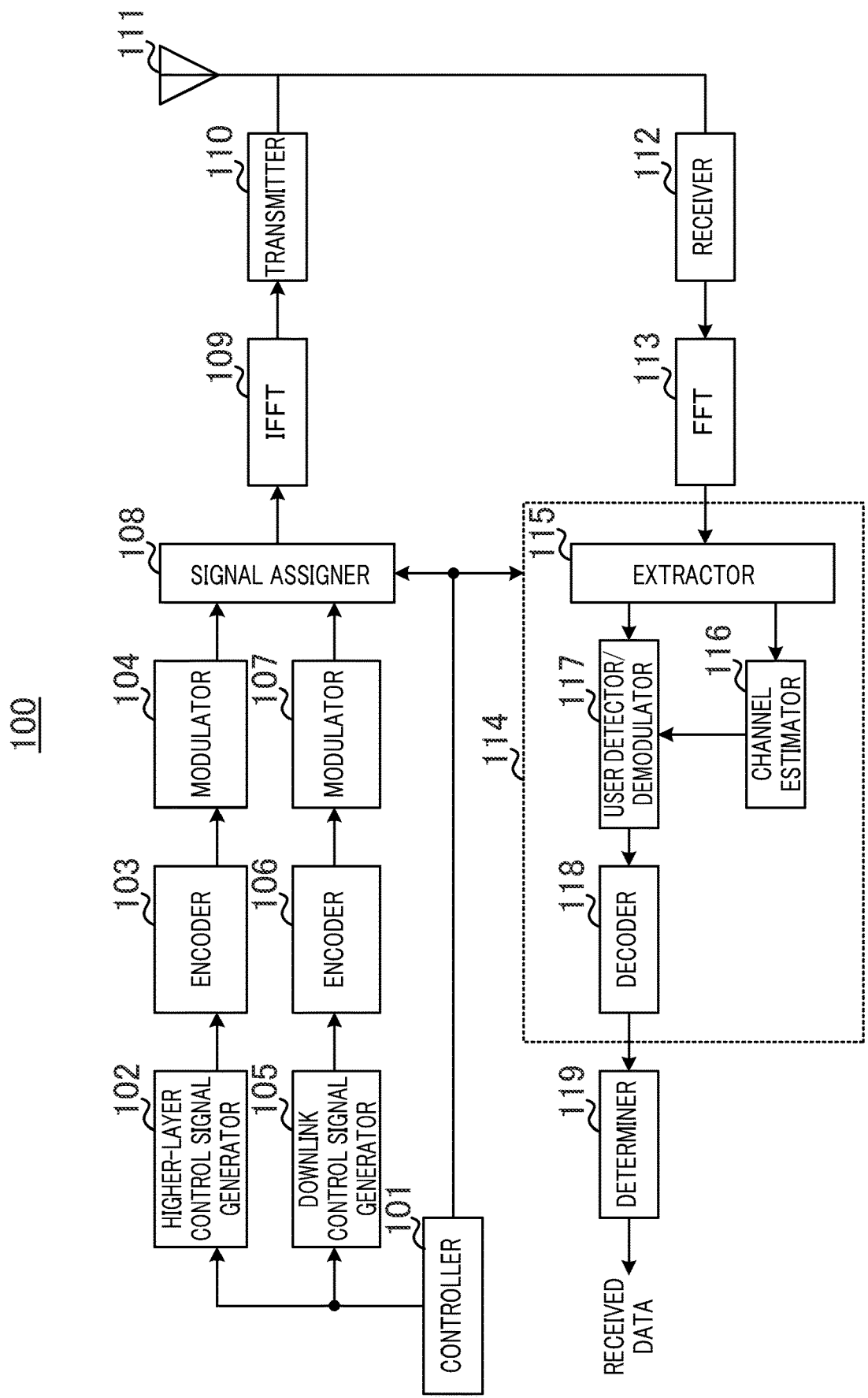
FIG. 3 is a block diagram illustrating a configuration of the base station according to Embodiment 1.

FIG. 3 is a block diagram illustrating a configuration of base station 100 according to Embodiment 1. In FIG. 3, base station 100 includes controller 101, higher-layer control signal generator 102, encoder 103, modulator 104, downlink control signal generator 105, encoder 106, modulator 107, signal assigner 108, Inverse Fast Fourier Transformer (hereinafter, referred to as "IFFT") 109, transmitter 110, antenna 111, receiver 112, Fast Fourier Transformer (hereinafter, referred to as "FFT") 113, received signal processor 114, and determiner 119.

Controller 101 determines the control information on uplink transmission of terminal 200, and outputs the determined control information to higher-layer control signal generator 102, downlink control signal generator 105 and received signal processor 114.

The information on the uplink transmission includes, for example, information on the non-orthogonal multiple access, information on a code sequence orthogonal with each other in multiple slots to which Repetition signals are allocated (hereinafter, referred to as an orthogonal code over multiple slots), information on the Repetition, information on the schemes of coding and modulation, information on the radio resource allocation, and the like.

Further, the information to be outputted to higher-layer control signal generator 102 among the information on the uplink transmission includes, for example, the information on the non-orthogonal multiple access, the information on the orthogonal code over multiple slots, and the like. Additionally, the information to be outputted to downlink control signal generator 105 among the information on the uplink transmission includes, for example, the information on the non-orthogonal multiple access, the information on the orthogonal code over multiple slots, information on the uplink transmission whose transmission is indicated by a UL grant (e.g., the information indicating schemes of coding and modulation, or the information indicating the radio resource allocation), or the like. Note that the present disclosure is not limited to the above-mentioned examples, and the information on the uplink transmission may be included in either a higher-layer control signal or a downlink control signal.

In addition, controller 101 determines the radio resource allocation for downlink signals to transmit the higher-layer control signals or the downlink control signals, and outputs the downlink resource allocation information indicating the resource allocation of downlink signals to signal assigner 108.

Higher-layer control signal generator 102 generates a control information bit string using the control information to be inputted from controller 101, and outputs the generated control information bit string to encoder 103.

Encoder 103 applies error correction coding to the control information bit string to be inputted from higher-layer control signal generator 102 and outputs the operation signal after the coding to modulator 104.

Modulator 104 modulates the control signal (the control information bit string) to be inputted from encoder 103, and outputs the control signal after the modulation (a modulation signal sequence) to signal assigner 108.

Downlink control signal generator 105 generates a control information bit string using the control information to be inputted from controller 101, and outputs the generated control information bit string to encoder 106.

Note that the control information is transmitted to a plurality of terminals 200 in some cases. In such a case, downlink control signal generator 105 may generate the bit string including the terminal ID of each terminal 200 (or the information to identify each terminal) in the control information for each terminal 200 (e.g., information indicating the schemes of coding and modulation for the uplink transmission whose transmission is indicated by a UL grant or the radio resource allocation information).

Encoder 106 applies error correction coding to the control information bit string to be inputted from downlink control signal generator 105 and outputs the operation signal after the coding to modulator 107.

Modulator 107 modulates the control signal (the control information bit string) to be inputted from encoder 106, and outputs the control signal after the modulation (a modulation signal sequence) to signal assigner 108.

Signal assigner 108 maps the control signal to be inputted from modulator 104 or modulator 107 to the radio resource based on the downlink resource allocation information to be inputted from controller 101. Signal assigner 108 outputs the downlink signal including the mapped signal to IFFT 109.

IFFT 109 applies, for example, transmission waveform generation processing such as Orthogonal Frequency Division Multiplexing (OFDM) to the signal to be inputted from signal assigner 108. IFFT 109 applies a Cyclic Prefix (CP) in OFDM transmission applying a CP (not illustrated). IFFT 109 outputs the generated transmission waveform to transmitter 110.

Transmitter 110 applies RF processing such as Digital-to-Analog (D/A) conversion and up-conversion to the signal to be inputted from IFFT 109, and transmits the radio signal to terminal 200 via antenna 111.

Receiver 112 applies RF processing such as down-conversion or Analog-to-Digital (A/D) conversion to an uplink signal waveform received from terminal 200 via antenna 111, and outputs the uplink signal waveform after the reception processing to FFT 113.

FFT 113 applies FFT processing for converting a time-domain signal into a frequency-domain signal to the uplink signal waveform to be inputted from receiver 112. FFT 113 outputs the resultant frequency-domain signal from the FFT processing to received signal processor 114.

Received signal processor 114 applies, for example, channel estimation, user detection, demodulation processing, and decoding processing to the received signal to be inputted from FFT 113. Received signal processor 114 includes, for example, extractor 115, channel estimator 116, user detector/demodulator 117, and decoder 118.

Based on the information to be received from controller 101, extractor 115 extracts radio resource portions each including, for example, an uplink data signal or a reference signal (e.g., a Demodulation Reference Signal (DMRS)) from the signal to be inputted from FFT 113. Extractor 115 outputs the extracted radio resource component including the reference signal to channel estimator 116, and outputs the extracted radio resource component including the uplink data signal to user detector/demodulator 117.

Channel estimator 116 performs channel estimation using the reference signal to be inputted from extractor 115 and outputs the channel estimate to user detector/demodulator 117.

User detector/demodulator 117 detects a signal (i.e., detects an user) of each terminal 200 from the signal to be inputted from extractor 115 using the channel estimate to be inputted from channel estimator 116. User detector/demodulator 117 demodulates the detected signal of each terminal 200, and outputs the demodulation result to decoder 118.

Decoder 118 performs error correction decoding using the demodulation result to be inputted from user detector/demodulator 117, and outputs the bit sequence after decoding to determiner 119.

Determiner 119 applies error detection to the bit sequence to be inputted from decoder 118. Determiner 119 outputs the bit sequence (received data) when no error is detected from the bit sequence. When an error is detected from the bit sequence, however, base station 100 may generate a response signal (ACK/NACK signal) and make a retransmission request to terminal 200 (not illustrated).

[Configuration of Terminal]

Figure 4:
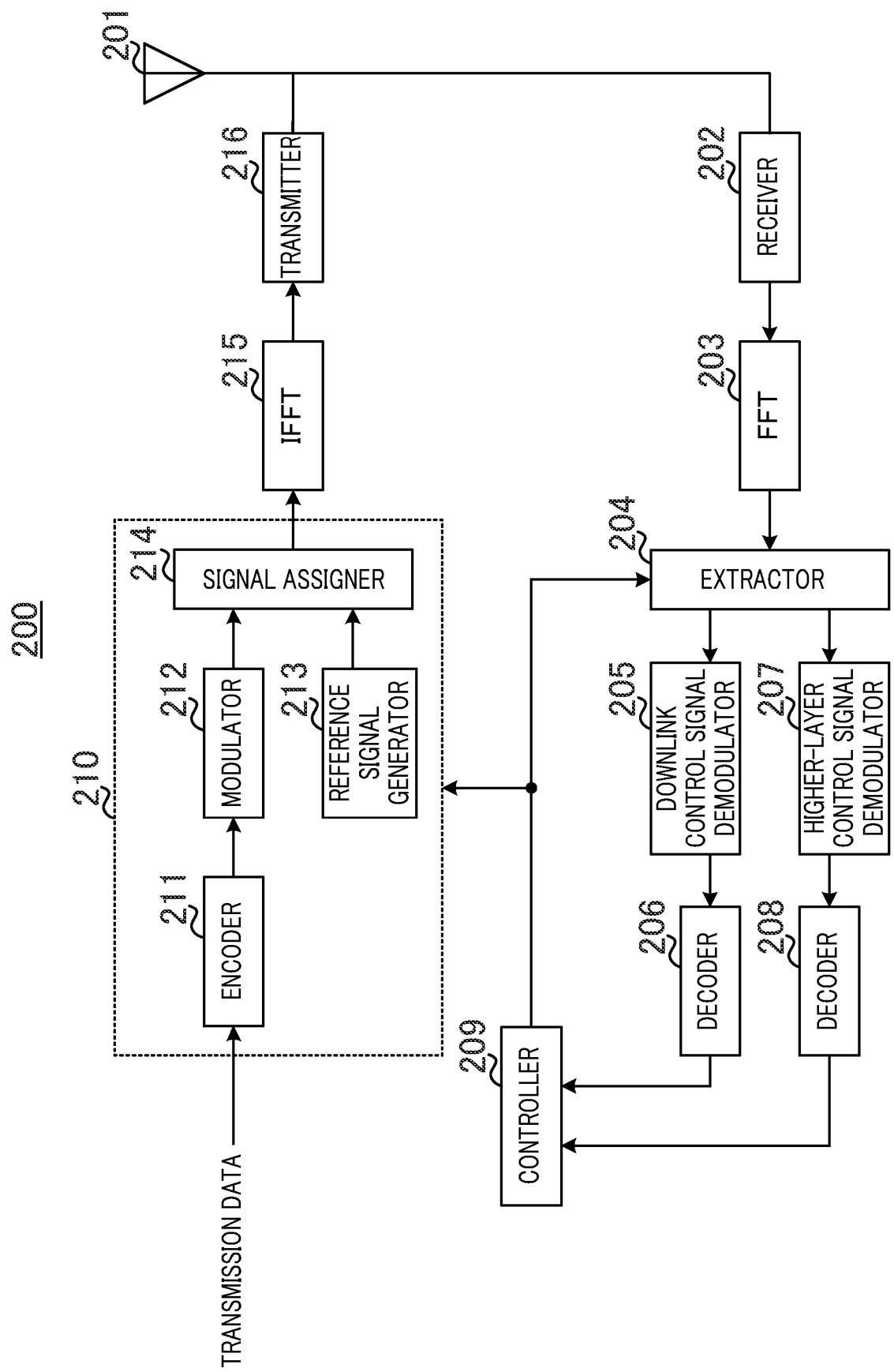
FIG. 4 is a block diagram illustrating a configuration of the terminal according to Embodiment 1.

FIG. 4 is a block diagram illustrating a configuration of terminal 200 according to Embodiment 1. In FIG. 4, terminal 200 includes antenna 201, receiver 202, FFT 203, extractor 204, downlink control signal demodulator 205, decoder 206, higher-layer control signal demodulator 207, decoder 208, controller 209, signal generator 210, IFFT 215, and transmitter 216.

Receiver 202 applies RF processing such as down-conversion or Analog-to-Digital (A/D) conversion to signal waveforms of downlink signals (e.g., control signals) received from base station 100 via antenna 201, and outputs the resultant received signals (baseband signals) to FFT 203.

FFT 203 applies FFT processing for converting time-domain signals into frequency-domain signals to the signals (time-domain signals) to be inputted from receiver 202. FFT 203 outputs the resultant frequency-domain signals from the FFT processing to extractor 204.

Extractor 204 extracts a received signal including the downlink control signal from the signals to be inputted from FFT 203 based on the control information (e.g., the radio resource allocation information) to be inputted from controller 209, and outputs the extracted signal to downlink control signal demodulator 205. Extractor 204 also extracts a received signal including the higher-layer control signal based on the control information (e.g., radio resource allocation information) to be inputted from controller 209, and outputs the received signal to higher-layer control signal demodulator 207.

Downlink control signal demodulator 205 applies blind decoding to the received signal to be inputted from extractor 204. When the received signal is determined to be a control signal addressed to terminal 200, downlink control signal demodulator 205 demodulates the control signal, and outputs the demodulation result to decoder 206.

Decoder 206 applies error correction decoding to the demodulation result to be inputted from downlink control signal demodulator 205, and obtains control information (e.g., a downlink control signal). Decoder 206 then outputs the resultant control information to controller 209.

Higher-layer control signal demodulator 207 demodulates the received signal to be inputted from extractor 204, and outputs the demodulation result to decoder 208.

Decoder 208 applies error correction decoding to the demodulation result to be inputted from higher-layer control signal demodulator 207, and obtains control information (e.g., a higher-layer control signal). Decoder 208 then outputs the resultant control information to controller 209.

Controller 209, for example, acquires control information indicating the radio resource allocation for the downlink signal to transmit the higher-layer control signal or the downlink control signal, and outputs the control information to extractor 204.

In addition, controller 209 acquires information on the uplink transmission of terminal 200 that is obtained from each of the downlink control signal to be inputted from decoder 206 and the higher-layer control signal to be inputted from decoder 208. Controller 209 calculates, for example, the schemes of coding and modulation or the radio resource allocation of the uplink transmission by using the information on the uplink transmission, and outputs the calculated information to signal generator 210.

Controller 209 also determines configurations of the non-orthogonal multiple access and configurations relating to the orthogonal code over multiple slots or the Repetition for data signals and reference signals, according to methods to be described later, and outputs the determined information to signal generator 210.

Signal generator 210 generates a signal for the non-orthogonal multiple access or the Repetition, which will be described later, based on the information to be inputted from controller 209. Signal generator 210 includes, for example, encoder 211, modulator 212, reference signal generator 213, and signal assigner 214.

Encoder 211 applies error correction coding to a transmission bit sequence (transmission data), and outputs the bit sequence after the coding to modulator 212.

Modulator 212 generates a modulation symbol sequence by modulating the bit sequence to be inputted from encoder 211, and outputs the modulation symbol sequence to signal assigner 214.

Reference signal generator 213 generates a reference signal sequence, and outputs the reference signal sequence to signal assigner 214.

Signal assigner 214 maps the signal to be inputted from modulator 212 or reference signal generator 213 to the radio resource to be indicated by controller 209. The signal mapping to the radio resource in signal assigner 214 includes, for example, Repetition processing or multiplication processing of a code over multiple slots. Signal assigner 214 outputs the uplink signal including the mapped signal to IFFT 215.

Note that a non-orthogonal multiple access signal may be generated in encoder 211, modulator 212, reference signal generator 213, or signal assigner 214.

IFFT 215 applies transmission waveform generation processing such as OFDM to the signal to be inputted from signal assigner 214. IFFT 215 outputs the generated transmission waveform to transmitter 216. IFFT 215 applies a Cyclic Prefix (CP) in OFDM transmission applying a CP (not illustrated). Alternatively, when IFFT 215 generates a single-carrier waveform (e.g., a DFT-s-OFDM waveform), the modulation symbol sequence to be outputted from modulator 212 may be converted into a symbol sequence in a frequency domain by applying Discrete Fourier Transform (DFT) (not illustrated).

Transmitter 216 applies Radio Frequency (RF) processing such as transmission power control, Digital-to-Analog (D/A) conversion, and up-conversion to the signal to be inputted from IFFT 215, and transmits the radio signal to base station 100 via antenna 201.

[Operations of Base Station 100 and Terminal 200]

Next, operations of base station 100 and terminal 200 that include above-mentioned configurations will be described in detail.

Figure 5:
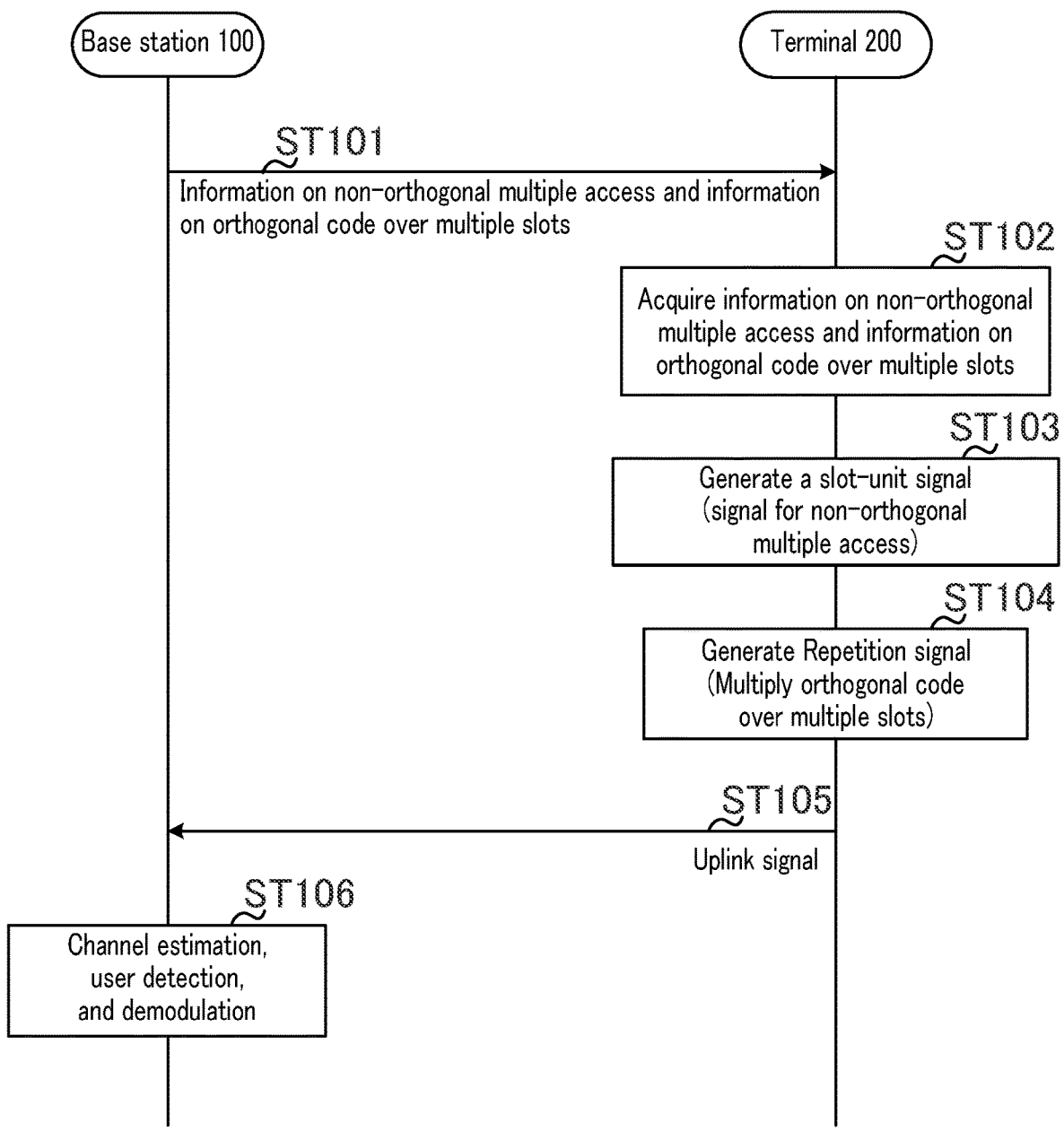
FIG. 5 is a sequence diagram indicating processing in the base station and the terminal according to Embodiment 1.

FIG. 5 illustrates processing in base station 100 and terminal 200 according to the present embodiment.

Base station 100 determines the information on the non-orthogonal multiple access and the information on the orthogonal code over multiple slots, for example, and transmits the information to terminal 200 (ST 101). Terminal 200 acquires the information on the non-orthogonal multiple access and the information on the orthogonal code over multiple slots each indicated by base station 100 (ST 102).

Terminal 200 generates a slot-unit signal (a signal for the non-orthogonal multiple access) based on the information on the non-orthogonal multiple access (ST 103).

Terminal 200 generates a Repetition signal applying the Repetition to the slot-unit signal (ST 104). To be more specific, terminal 200 multiplies the Repetition signal by the orthogonal code over multiple slots based on the information on the orthogonal code over multiple slots.

Terminal 200 transmits the generated uplink signal including the Repetition signal to base station 100 (ST 105).

Base station 100 receives the uplink signal to be transmitted from terminal 200, and then performs channel estimation processing, user detection processing, and demodulation processing (ST 106). Base station 100, for example, performs the user detection processing based on the information on the non-orthogonal multiple access and the information on the orthogonal code over multiple slots that base station 100 has indicated to terminal 200.

Next, a control method of the operation relating to uplink transmission in terminal 200 according to the present embodiment will be described in detail.

As described above, terminal 200 first generates the slot-unit signal based on the non-orthogonal multiple access when applying the Repetition over multiple slots (processing of ST 103 illustrated in FIG. 5), as is the case with a single slot allocation. Terminal 200 then multiplies, over multiple slots, the generated slot-unit signal by the orthogonal code over multiple slots (processing of ST 104 illustrated in FIG. 5) at the time of performing the Repetition of the slot-unit signal over the multiple slots.

The orthogonal code over multiple slots includes, for example, a code sequence for terminals using the same time resource or the same frequency resource to be orthogonal among slots. That is, a signal to which the Repetition over multiple slots is applied is spread over multiple slots by the orthogonal code over multiple slots.

Figure 6:
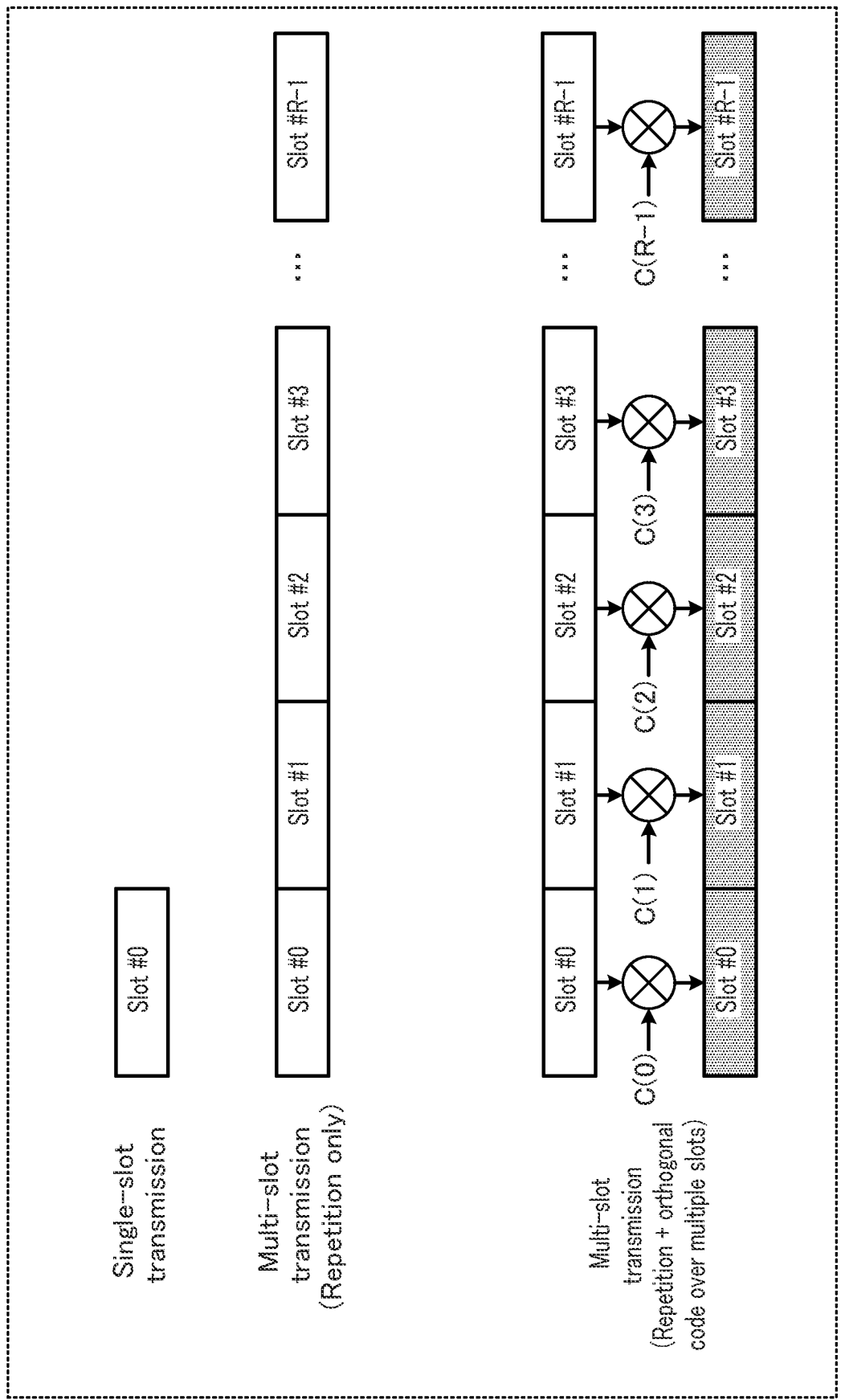
FIG. 6 is a diagram illustrating an example of generating a Repetition signal according to Embodiment 1.

FIG. 6 illustrates an example of signal generation processing in terminal 200.

As an example, terminal 200 performs the Repetition of a single-slot-unit signal over R slots (e.g., slot #0 to #R-1) as illustrated in FIG. 6.

In this case, terminal 200 multiplies the single slot-unit signal by the orthogonal code over multiple slots {C(0), C(1), C(2), . . . , C(R-1)}, as illustrated in FIG. 6. For example, the sequence length Y of the orthogonal code over multiple slots and the number of the Repetition R have the same value with each other in FIG. 6.

As described above, a Repetition signal to be generated in terminal 200 is a signal obtained by multiplying a signal generated in a single slot based on the non-orthogonal multiple access by the orthogonal multiple access code sequence (the orthogonal code over multiple slots) in each of the multiple slots.

For example, when maximum U terminals can be multiplexed using X radio resources (e.g., resource elements (REs)) for the non-orthogonal multiple access in the single slot allocation, a plurality of terminals 200 can be multiplexed in each slot using the orthogonal code over multiple slots, the length of which is the same value of the number of the Repetition R. In FIG. 6, for example, the number of the multiplexed terminals is represented by R×U.

Meanwhile, base station 100 as a receiving side first performs despreading processing of the orthogonal code over multiple slots, and separates the signals of multiplexed terminals 200 with the orthogonal code over multiple slots in user detection and demodulation processing. Then, base station 100 performs the user detection and the demodulation processing of the non-orthogonal multiple access, as is the case with the single slot allocation.

In this case, the computational complexity in the user detection and the demodulation processing further includes the computational complexity required for the despreading of the orthogonal code over multiple slots, in addition to the computational complexity required for the user detection and the demodulation processing for the non-orthogonal multiple access in the single slot allocation.

As described above, the computational complexity on the receiving side would exponentially increase with the increase in the number of the multiplexed terminals, in the method of increasing the number of the multiplexed terminals by increasing the Signature size in the non-orthogonal multiple access according to the number of the Repetition when the Repetition is applied. In contrast, increasing the number of the multiplexed terminals by applying the orthogonal code over multiple slots as illustrated in FIG. 6 enables to reduce the increase in the computational complecity on the receiving side. When an orthogonal code sequence such as a Walsh sequence is used for the orthogonal code over multiple slots, for example, a value of the computational complexity required for the despreading is that of the sequence length Y of the orthogonal code over multiple slots or the order of the first power of the number of the multiplexed terminals.

This makes it possible to reduce the increase in the computational complexity of the user detection and the demodulation while avoiding the deterioration of the frequency utilization efficiency due to the Repetition in the present embodiment.

<Indication of Orthogonal Code over Multiple Slots>

Next, descriptions will be given of the methods for indicating the orthogonal code over multiple slots to be used from base station 100 to terminal 200. This enables the receiving side (base station 100) and the transmitting side (terminal 200) to share which orthogonal code over multiple slots is used.

Hereinafter, Option 1 and Option 2 will be described as examples of the indication methods of the orthogonal code over multiple slots.

[Option 1]

In Option 1, the orthogonal code over multiple slots is dynamically indicated to terminal 200 using a DCI to be transmitted in a Physical Downlink Control Channel (PDCCH) that schedules uplink transmission.

In this case, the orthogonal code over multiple slots to be indicated by the DCI may be any one of the candidate sequences determined in advance by a standard, or any one of the candidate sequences indicated by a cell-specific (or group-common) or UE-specific higher-layer signalling.

Further, the orthogonal code over multiple slots is not limited to being explicitly indicated by the DCI, and may be implicitly indicated by other information (parameters) to be indicated by the DCI. For example, when a Signature used for the non-orthogonal multiple access in a slot unit is indicated to terminal 200 by the DCI, the orthogonal code over multiple slots may be associated one-to-one with the Signature. The overhead for the indication of the orthogonal code over multiple slots can be reduced when the orthogonal code over multiple slots is implicitly indicated.

[Option 2]

In Option 2, the orthogonal code over multiple slots is semi-statically indicated to terminal 200, using a cell-specific (or group-common) or UE-specific higher-layer signalling.

In this case, the orthogonal code over multiple slots is not limited to being explicitly indicated by the higher-layer signalling, and may be implicitly indicated by other information (parameters) to be indicated by the higher-layer signalling. For example, when a Signature used for the non-orthogonal multiple access in a slot unit is indicated to terminal 200 by the higher-layer signalling, the sequence length Y of the orthogonal code over multiple slots may be associated one-to-one with the Signature. Alternatively, the orthogonal code over multiple slots may be associated with a terminal ID (e.g., Radio Network Temporary Identifier (RNTI)). The overhead for the indication of the orthogonal code over multiple slots can be reduced when the orthogonal code over multiple slots is implicitly indicated.

The indication methods of the orthogonal code over multiple slots have been described, thus far.

As described above, according to the present embodiment, terminal 200 generates the transmission signal to be repeatedly transmitted over multiple slots, based on the combination of the non-orthogonal multiple access, where signals of a plurality of terminals 200 are not orthogonal with each other, and the orthogonal multiple access, where signals of a plurality of terminals 200 are orthogonal with each other. In addition, base station 100 demodulates the transmission signal to be transmitted from terminal 200 based on the combination of the non-orthogonal multiple access and the orthogonal multiple access.

To be more specific, in the present embodiment, terminal 200 generates a slot-unit signal based on the non-orthogonal multiple access, multiplies the slot-unit signal over multiple slots by the orthogonal code over multiple slots (in other words, the code sequence for multiple signals to be orthogonal in each of the multiple slots), and transmits the signal to base station 100. Meanwhile, base station 100 performs the despreading of the orthogonal code over multiple slots to the transmission signal to be transmitted from terminal 200, and performs the user detection and the demodulation processing based on the non-orthogonal multiple access, to the slot-unit signal.

This makes it possible, in the present embodiment, to reduce the increase in the computational complexity of the user detection and the demodulation processing in base station 100 to achieve the non-orthogonal multiple access while applying the Repetition, compared with the method of enhancing the Signature size, which generates the signal for the non-orthogonal multiple access, to multiple slots.

Further, in the present embodiment, the slot-unit signal is generated on the basis of the non-orthogonal multiple access even when the Repetition is applied, thereby improving the frequency utilization efficiency in uplink as is the case with the single slot allocation.

The present embodiment thus enables to improve the frequency utilization efficiency in uplink while avoiding the increase in the computational complexity of the user detection, the demodulation processing, or the like in base station 100 (the receiving side), when the Repetition is applied.

Variation of Embodiment 1

Note that the sequence length of the orthogonal code over multiple slots and the number of the Repetition do not have to have the same values with each other in the present embodiment. For example, the sequence length Y of the orthogonal code over multiple slots may have a smaller value than the number of the Repetition as illustrated in FIG. 7.

Figure 7:
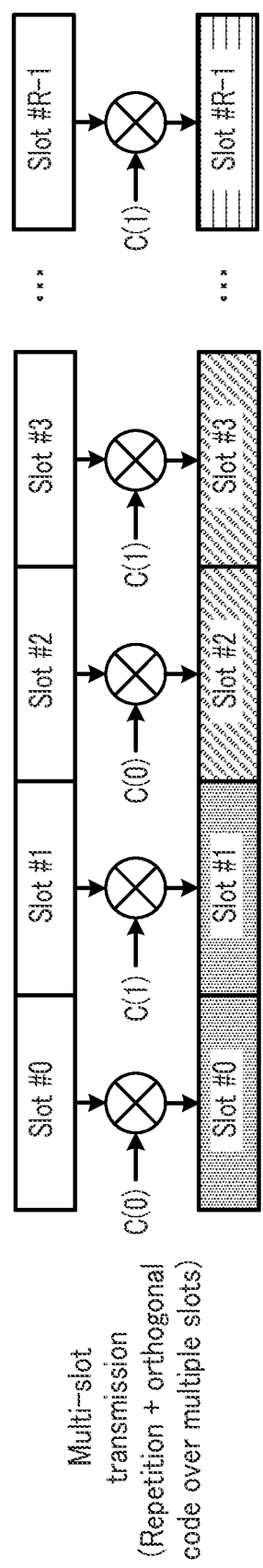
FIG. 7 is a diagram illustrating another example of generating the Repetition signal according to Embodiment 1.

FIG. 7 illustrates an example where the sequence length of the orthogonal code over multiple slots is 2, and the number of the Repetition is R (>2).

For example, as illustrated in FIG. 7, terminal 200 multiplies the signals in two slots of slot #0 and slot #1 by the orthogonal code over multiple slots {C(0), C(1)}. Similarly, terminal 200 multiplies the signals in two slots of slot #2 and slot #3 by the orthogonal code over multiple slots {C(0), C(1)}. Terminal 200 multiplies the signals by the orthogonal code over multiple slots {C(0), C(1)} in the same manner in the other slots used for the Repetition. Note that the orthogonal code over multiple slots for the signals in the two slots of slot #0 and slot #1 and that for the signals in the two slots of slot #2 and slot #3 may not be the same with each other.

In FIG. 7, for example, when maximum U terminals can be multiplexed using X radio resources (e.g., resource elements (REs)) for the non-orthogonal multiple access in the case of the single slot allocation, a plurality of terminals 200 can be multiplexed in each slot using the orthogonal code over multiple slots with a sequence length of 2. The number of the multiplexed terminals is represented by 2×U in FIG. 7, for example.

According to the method illustrated in FIG. 7, it is possible to reduce the increase in the computational complexity of the user detection and the demodulation although the increase in number of the multiplexed terminals with the application of the orthogonal code over multiple slots is limited to the value of the sequence length of the orthogonal code over multiple slots. The increase in the computational complexity of the user detection and the demodulation is more effectively reduced in particular with the very large number of the Repetition.

In addition, terminals 200 are orthogonal among slots in units of the sequence length Y of the orthogonal code over multiple slots, thereby facilitating multiplexing of terminals 200 with different numbers of the Repetition.

Note that the sequence length Y of the orthogonal code over multiple slots may be determined in advance by a standard as a cell-specific value (or a group-common value), and may be indicated to terminal 200 using a cell-specific (or a group-common) higher-layer signalling. In addition, the sequence length Y of the orthogonal code over multiple slots may be semi-statically indicated as an UE-specific value using an UE-specific higher-layer signalling, or may be dynamically indicated to terminal 200 using a downlink control information (DCI). Further, for example, a plurality of the candidate sequence lengths Y of the orthogonal code over multiple slots may be semi-statically indicated to terminal 200 by a cell-specific (or a group-common) or an UE-specific higher-layer signalling, and any one of the candidate sequence lengths may be further indicated to terminal 200 dynamically by the DCI.

Embodiment 2

In radio communication systems in general, a communication path (a channel) between transmission and reception needs to be estimated in advance (channel estimation) in order to demodulate data signals. Thus, a plurality of data symbols and Demodulation Reference Signals (DMRSs) are multiplexed in each of the slots or subframes.

Figure 8:
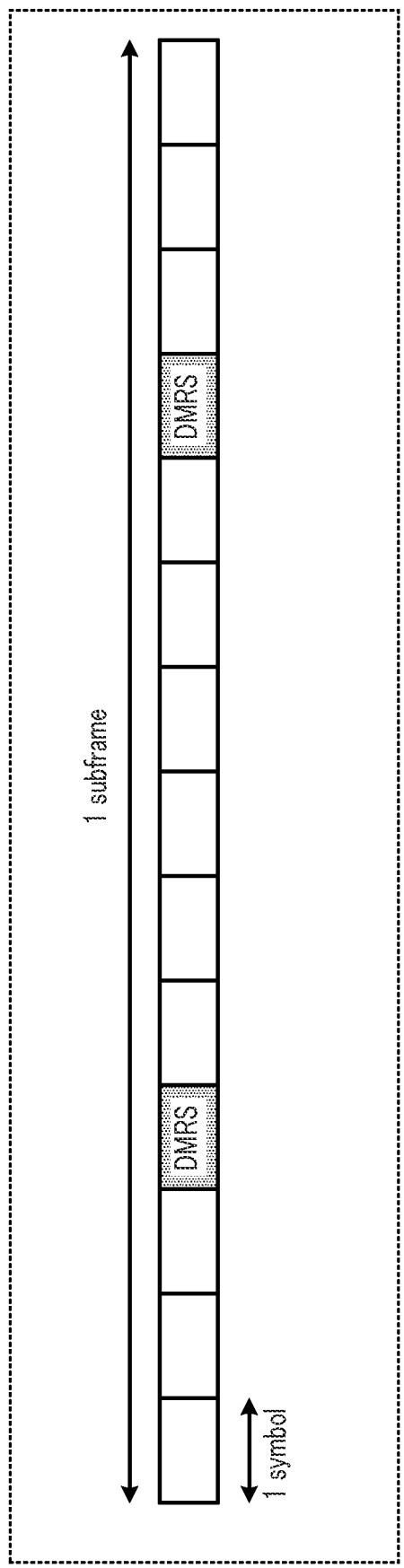
FIG. 8 is a diagram illustrating an exemplary configuration of a subframe in an LTE PUSCH.
Figure 9:
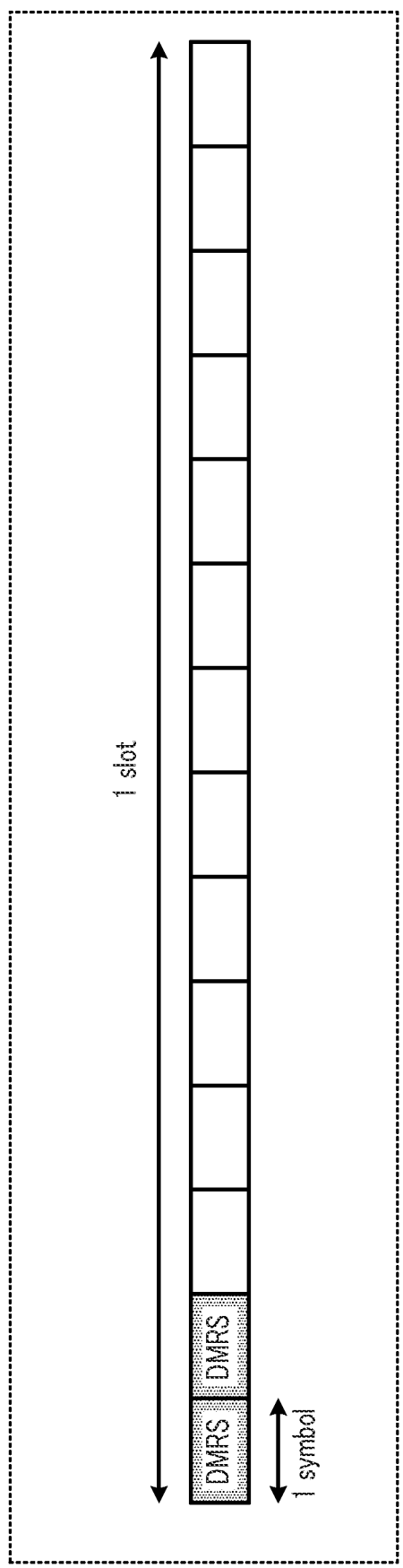
FIG. 9 is a diagram illustrating an exemplary configuration of a slot in an NR PUSCH.

For example, FIG. 8 illustrates an exemplary configuration of a subframe including 14 symbols in an LTE uplink data channel (LTE Physical Uplink Shared Channel (LTE PUSCH)). In contrast, FIG. 9 illustrates an exemplary configuration of a slot including 14 symbols in a PUSCH of NR (referred to as NR PUSCH).

In the present embodiment, descriptions will be given of the generation of reference signals and the generation of data signals in non-orthogonal multiple access when Repetition is applied over the multiple slots.

In the present embodiment, when the Repetition is applied over the multiple slots, the multiple access applied to each of the reference signals and the data signals, among the non-orthogonal multiple access and the orthogonal multiple access, may be different from each other, for example. In other words, the Signature to be used for the non-orthogonal multiple access or the code sequence to be used for the orthogonal multiple access applied to each of the reference signals and the data signals may be different from each other.

Note that a base station and a terminal according to the present embodiment have the same basic configuration as base station 100 and terminal 200 according to Embodiment 1, and thus FIGS. 3 and 4 will be used for explanation.

Figure 10:
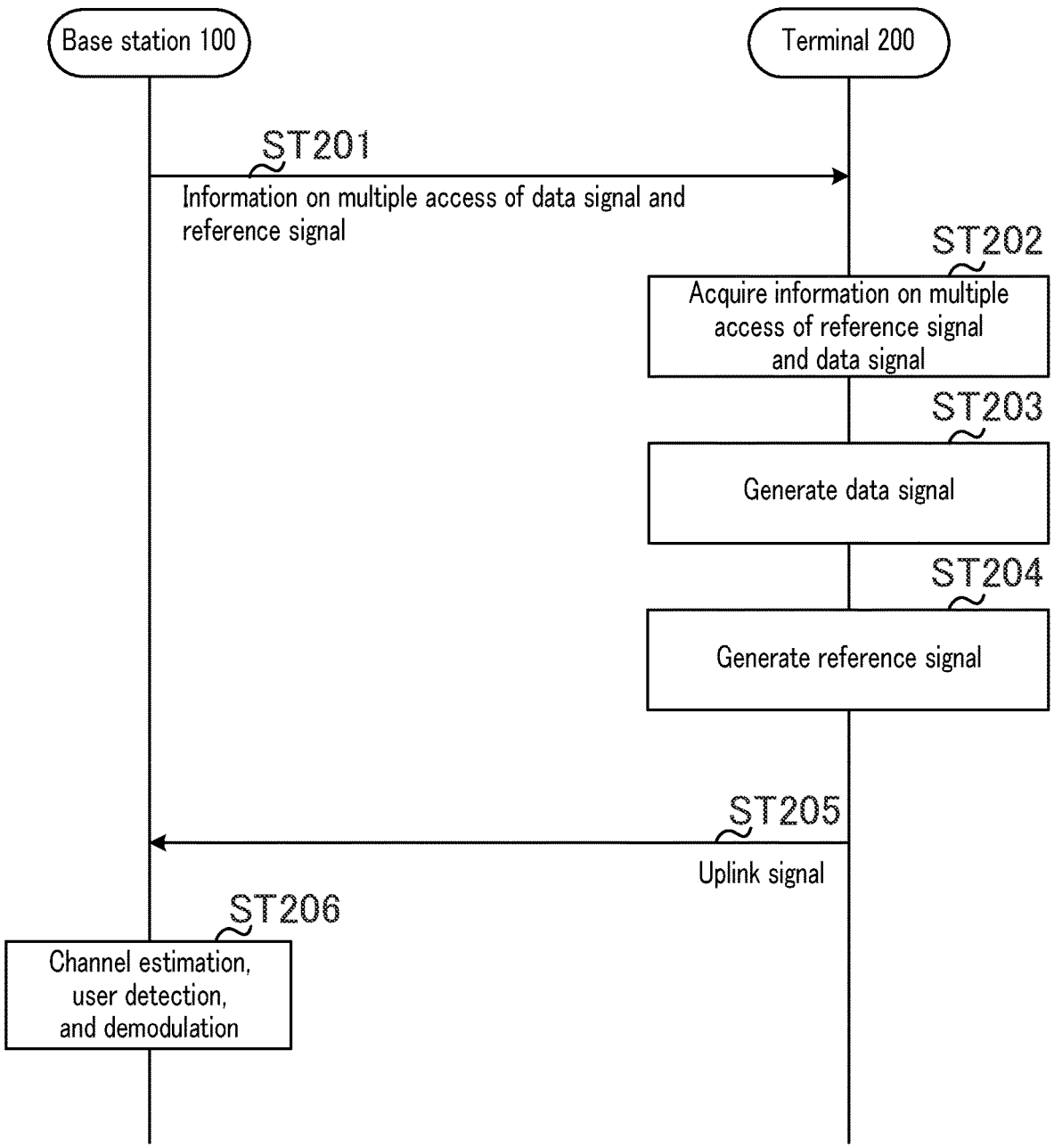
FIG. 10 is a sequence diagram indicating processing in the base station and the terminal according to Embodiment 2.

FIG. 10 illustrates processing in base station 100 and terminal 200 according to the present embodiment.

Base station 100, for example, transmits information on the multiple access of the data signal and the reference signal to terminal 200 (ST201). The information on the multiple access includes, for example, information on the configuration of the multiple access (the orthogonal multiple access or the non-orthogonal multiple access) applied to each of the data signal and the reference signal (the information includes the code sequence or the Signature, for example). Note that the information on the multiple access of the data signal and the reference signal is indicated to terminal 200 using a higher-layer control signalling or a downlink control information.

Terminal 200 acquires the information on the multiple access of the data signal and the reference signal indicated from base station 100 (ST202).

Terminal 200 generates the data signal based on the information on the multiple access of the data signal (ST203). Terminal 200 generates the reference signal based on the information on the multiple access of the reference signal (ST204). Note that details of the generation methods of the data signal and the reference signal in ST203 and ST204 will be described later.

Terminal 200 transmits the uplink signal including the generated data signal and reference signal to base station 100 (ST205).

Base station 100 receives the uplink signal to be transmitted from terminal 200, and then performs channel estimation processing, user detection processing, and demodulation processing on the basis of, for example, the information on the multiple access of the data signal and the reference signal (ST206).

Next, the generation methods of the data signal and the reference signal will be described. Terminal 200 (a transmitting side) generates a Repetition signal including the data signal and the reference signal according to, for example, any of the following Option 1 to Option 3.

[Option 1]

In general, the reception SNR or Signal to Interference and Noise power Ratio (SINR) is assumed to be low in scenarios requiring Repetition (scenarios with the large number of Repetition, in particular). In such an environment, it is crucial to obtain a highly accurate channel estimate to accurately demodulate the data signals on the receiving side (e.g., base station 100). When the non-orthogonal multiple access is applied to the reference signals, however, the interference gives a greater influence to the channel estimation, and this may result in a failure to obtain a sufficiently highly accurate channel estimation result to demodulate the data signals.

In this regard, the non-orthogonal multiple access is not applied to the reference signals in Option 1. In other words, the orthogonal multiple access is applied to the reference signals in Option 1. Thus, the reference signals are orthogonal among multiplexed terminals both in a slot and among slots in Option 1.

To be more specific, terminal 200 first generates a signal for the orthogonal multiple access as is the case with the single slot allocation when the Repetition is applied to the reference signals over multiple slots.

Terminal 200 then multiplies a code sequence for terminals using the same time resource or the same frequency resource to be orthogonal among slots (the orthogonal code over multiple slots) when the Repetition is applied to the generated slot-unit signal over multiple slots.

Note that the following methods may be applied to the signals for the orthogonal multiple access: Frequency Division Multiplexing (FDM) using different frequency resources among a plurality of terminals 200, Time Division Multiplexing (TDM) using different time resources among terminals 200, or Code Division Multiplexing (CDM) using the same time and frequency resources among terminals 200 and applying different orthogonal code sequences.

In Option 1, the reference signals are orthogonal among multiplexed terminals both in a slot and among slots. This enables the receiving side (e.g., base station 100) to obtain a highly accurate channel estimation result even in an environment with the low received NR or SINR, and to accurately demodulate the data signals.

Next, generation methods of the data signals in Option 1 (Option 1-1 to Option 1-3) will be described.

{Option 1-1}

In Option 1-1, the non-orthogonal multiple access is not applied to the data signals as is the case with the reference signals. In other words, the orthogonal multiple access is applied to the data signals in Option 1-1. Thus, the data signals are orthogonal among multiplexed terminals both in a slot and among slots.

That is, the combination of multiple accesses in a slot and among slots applied to the data signals and the combination of multiple accesses in a slot and among slots applied to the reference signals are the same in Option 1-1.

Figure 11:
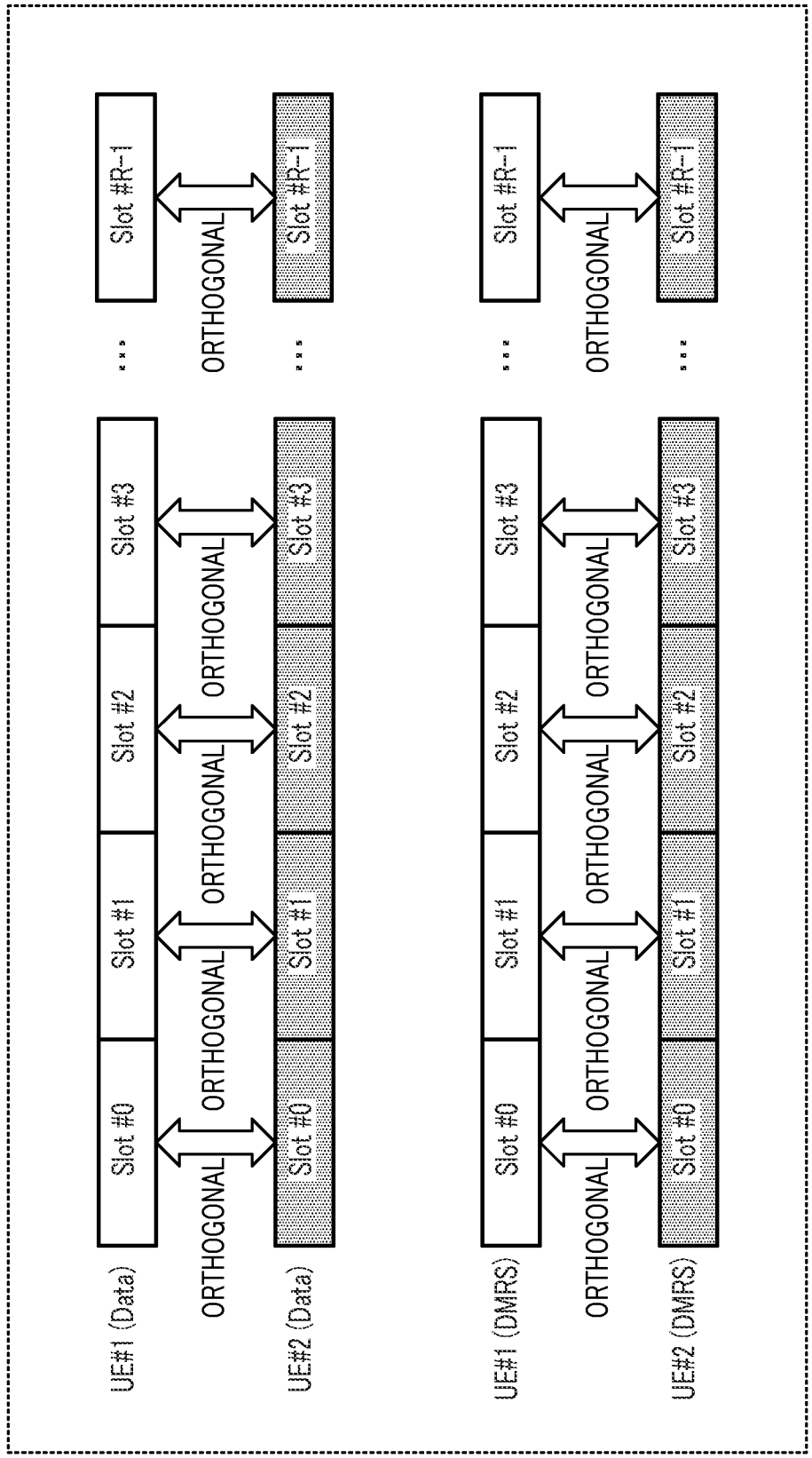
FIG. 11 is a diagram illustrating an example of generating the Repetition signal according to Option 1-1 of Embodiment 2.

For example, terminal 200 first generates signals for the orthogonal multiple access (data signals and reference signals) as is the case with the single slot allocation when the Repetition is applied to both the data signals (Data) and the reference signals (e.g., DMRSs) over multiple slots (e.g., R slots) as illustrated in FIG. 11.

Terminal 200 then multiplies, as illustrated in FIG. 11, the orthogonal code over multiple slots (in other words, a code sequence for terminals using the same time resource or the same frequency resource to be orthogonal among slots) when the Repetition is applied to the generated slot-unit signals over multiple slots.

Note that FDM, TDM, CDM, or the like may be applied to the signals for the orthogonal multiple access between terminals 200 (UE1 and UE2 in FIG. 11).

Incidentally, the multiplexing method (e.g., FDM, TDM, or CDM) for generating signals for the orthogonal multiple access and the orthogonal code over multiple slots may be the same for the data signals and the reference signals, or at least either one may be different from the other.

Option 1-1 is suitable for an environment in which, for example, SNR or SINR is poor and the non-orthogonal multiple access cannot be applied to both reference signals and data signals.

{Option 1-2}

In Option 1-2, the non-orthogonal multiple access is applied to the data signals. To be more specific, the data signals are non-orthogonal among multiplexed terminals both in a slot and among slots.

That is, the combination of multiple accesses in a slot and among slots applied to the data signals and the combination of multiple accesses in a slot and among slots applied to the reference signals are different from each other in Option 1-2.

Figure 12:
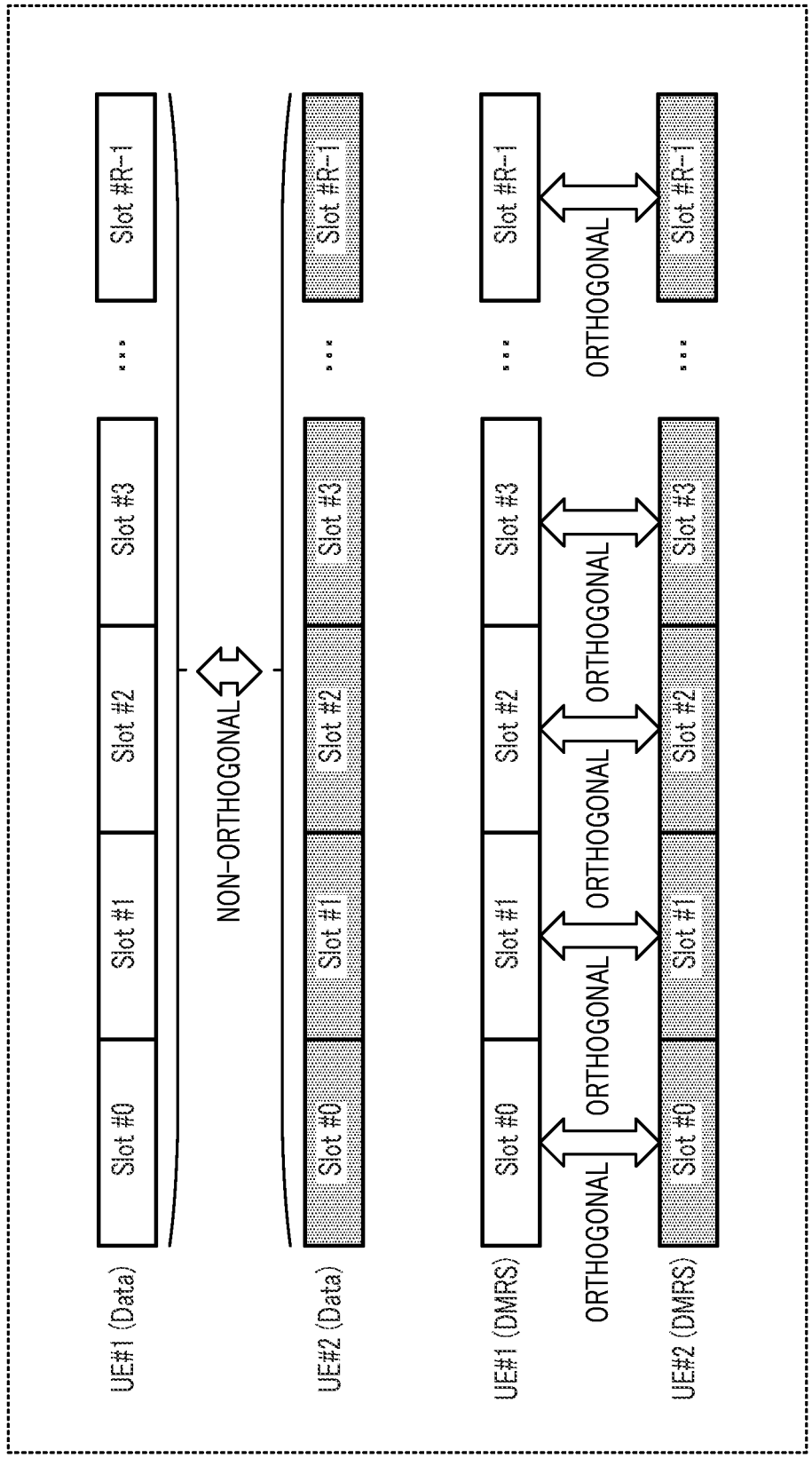
FIG. 12 is a diagram illustrating an example of generating the Repetition signal according to Option 1-2 of Embodiment 2.

When the Repetition is applied to the data signals over multiple slots, the number of the multiplexed terminals is increased by increasing the Signature size in the non-orthogonal multiple access according to the number of the Repetition as illustrated in FIG. 12. This prevents the frequency utilization efficiency for the data signals from deteriorating due to the Repetition.

Option 1-2 is suitable when, for example, the amount of orthogonal resources allocatable to the reference signals is sufficiently larger than the amount of orthogonal resources allocatable to the data signals. In such a case, the application of Option 1-2 enables to increase the number of the multiplexed terminals even in the environment with the low SNR or SINR, and to accurately demodulate the data signals in base station 100 using the orthogonal reference signals among the multiplexed terminals.

{Option 1-3}

Figure 13:
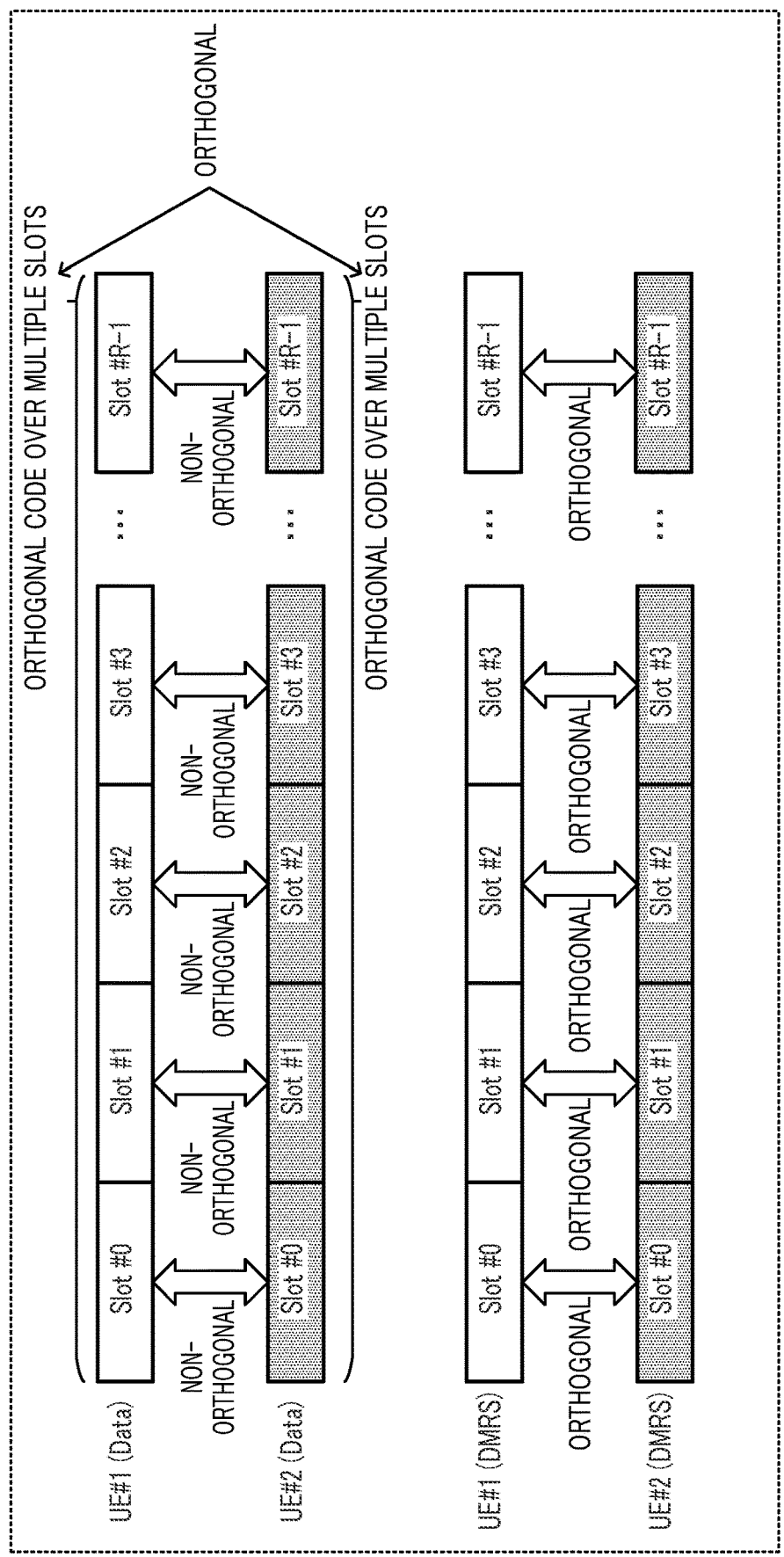
FIG. 13 is a diagram illustrating an example of generating the Repetition signal according to Option 1-3 of Embodiment 2.

In Option 1-3, the non-orthogonal multiple access is applied to the data signals. Further, in Option 1-3, as illustrated in FIG. 13, the data signals are non-orthogonal in a slot among the multiplexed terminals, and are orthogonal among slots among the multiplexed terminals, as described in Embodiment 1 (see, for example, FIG. 6).

That is, the combination of multiple accesses in a slot and among slots applied to the data signals and the combination of multiple accesses in a slot and among slots applied to the reference signals are different from each other in Option 1-3.

In Option 1-3, the generation method of the data signals is similar to that in Embodiment 1, and the generation method of the reference signals is similar to that in Option 1-1 or Option 1-2.

Option 1-3 is suitable as is the case with Option 1-2 when, for example, the amount of orthogonal resources allocatable to the reference signals is sufficiently larger than the amount of orthogonal resources allocatable to the data signals. The application of Option 1-3 enables to increase the number of the multiplexed terminals even in the environment with the low SNR or SINR, and to accurately demodulate the data signals in base station 100.

Further, in Option 1-3, the application of the orthogonal code over multiple slots increases the number of the multiplexed terminals, as is the case with Embodiment 1, thereby preventing the deterioration of the frequency utilization efficiency due to the Repetition and reducing the increase in the computational complexity of the user detection, the demodulation processing or the like.

[Option 2]

In Option 2, the non-orthogonal multiple access is applied to the reference signals. In addition, the reference signals are non-orthogonal among the multiplexed terminals both in a slot and among slots in Option 2.

For example, when the Repetition is applied to the reference signals over multiple slots, the number of the multiplexed terminals is increased by increasing the Signature size in the non-orthogonal multiple access according to the number of the Repetition. This prevents the frequency utilization efficiency for the reference signals from deteriorating due to the Repetition.

Option 2 is suitable when, for example, the amount of orthogonal resources allocatable to the reference signals is sufficiently smaller than the amount of orthogonal resources allocatable to the data signals. In such a case, the application of Option 2 enables to secure the number of the multiplexed reference signals by the non-orthogonal multiple access, thereby increasing the number of the multiplexed terminals.

In addition, Option 2 improves the frequency utilization efficiency in uplink in an environment with high SNR or SINR.

Next, generation methods of the data signals in Option 2 (Option 2-1 to Option 2-3) will be described.

{Option 2-1}

In Option 2-1, the non-orthogonal multiple access is not applied to the data signals. In other words, the orthogonal multiple access is applied to the data signals in Option 2-1. Thus, the data signals are orthogonal among the multiplexed terminals both in a slot and among slots.

That is, the combination of multiple accesses in a slot and among slots applied to the data signals and the combination of multiple accesses in a slot and among slots applied to the reference signals are different from each other in Option 2-1.

Figure 14:
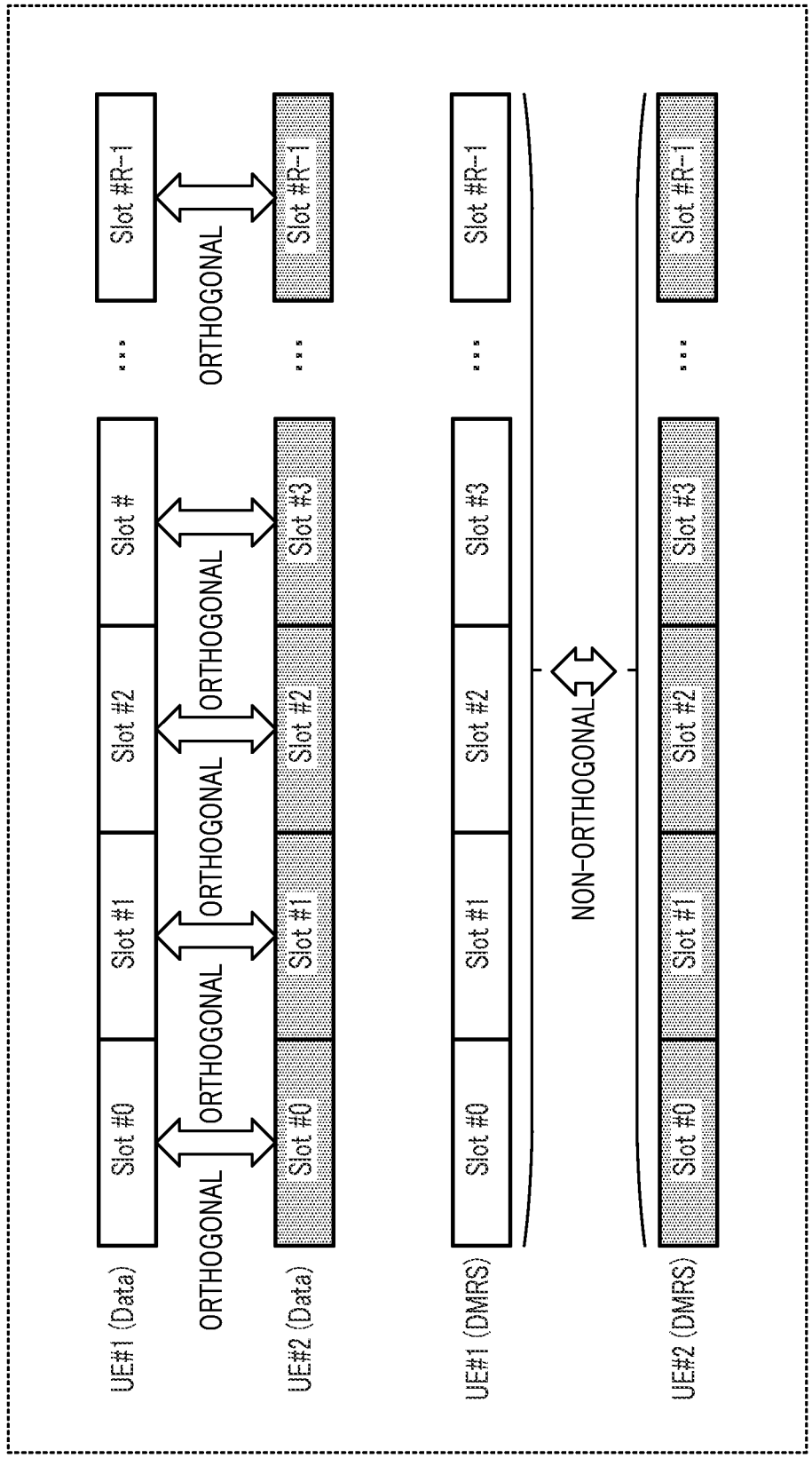
FIG. 14 is a diagram illustrating an example of generating the Repetition signal according to Option 2-1 of Embodiment 2.

For example, terminal 200 first generates the data signals for the orthogonal multiple access as is the case with the single slot allocation when the Repetition is applied to the data signals over multiple slots (e.g., R slots) as illustrated in FIG. 14. FDM, TDM, CDM, or the like may be applied to the signals for the orthogonal multiple access, for example.

Terminal 200 then multiplies, as illustrated in FIG. 14, the orthogonal code over multiple slots when the Repetition is applied to the generated slot-unit signals over multiple slots.

Option 2-1 enables to increase the number of the multiplexed terminals when, for example, the amount of orthogonal resources allocatable to the reference signals is sufficiently smaller than the amount of orthogonal resources allocatable to the data signals.

{Option 2-2}

In Option 2-2, the non-orthogonal multiple access is applied to the data signals. To be more specific, the data signals and the reference signals are non-orthogonal among the multiplexed terminals both in a slot and among slots in Option 2-2.

That is, the combination of multiple accesses in a slot and among slots applied to the data signals and the combination of multiple accesses in a slot and among slots applied to the reference signals are the same in Option 2-2.

Figure 15:
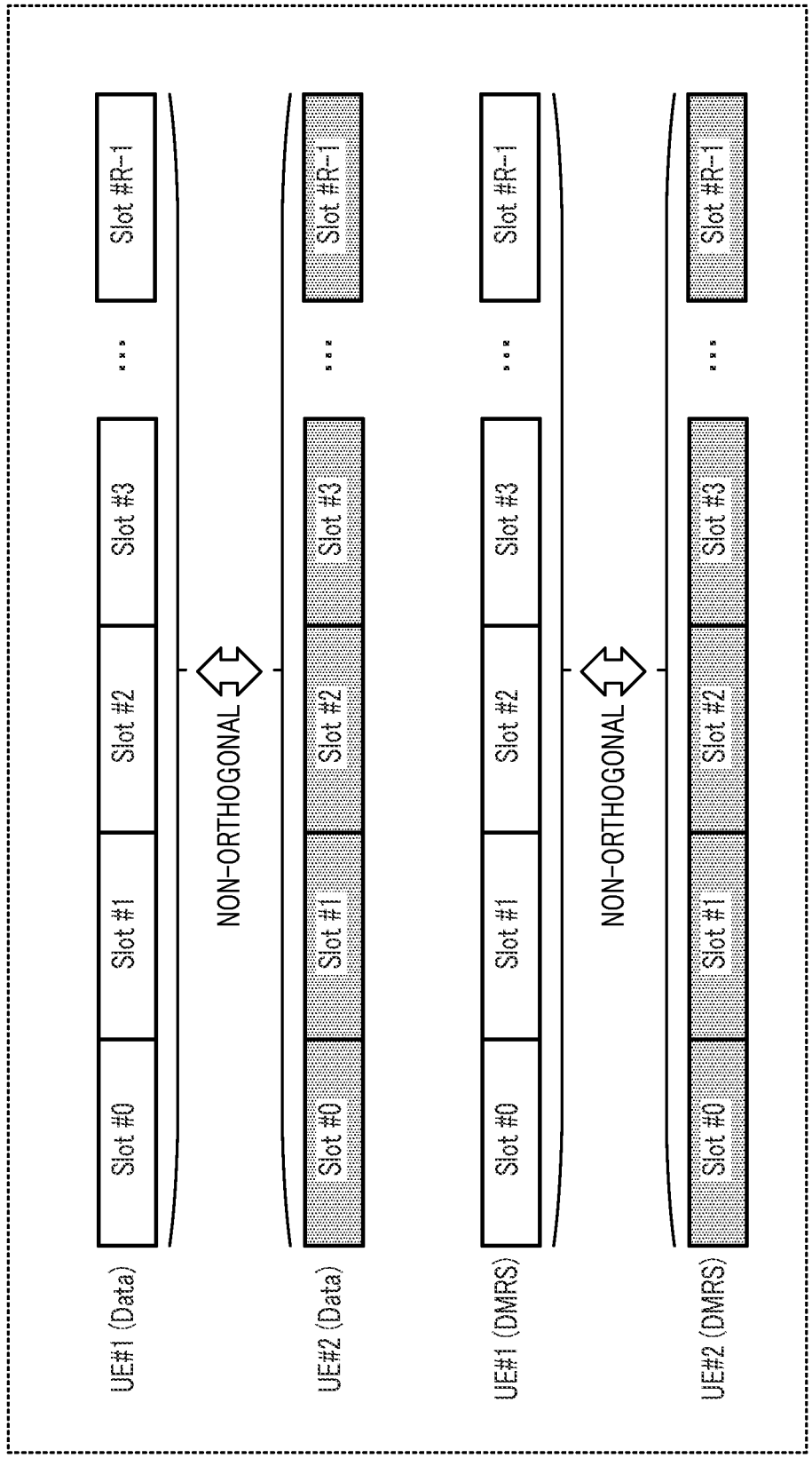
FIG. 15 is a diagram illustrating an example of generating the Repetition signal according to Option 2-2 of Embodiment 2.

When the Repetition is applied to the data signals and the reference signals over multiple slots, the number of the multiplexed terminals is increased by increasing the Signature size in the non-orthogonal multiple access according to the number of the Repetition as illustrated in FIG. 15. This prevents the frequency utilization efficiency for the data signals and the reference signals from deteriorating due to the Repetition.

Note that the generation method of the signals for the non-orthogonal multiple access for the reference signals and the data signals may be the same with each other or different from each other.

Option 2-2 is suitable, for example, for the environment with high SNR or SINR. The application of Option 2-2 in the environment with high SNR or SINR improves the frequency utilization efficiency in uplink.

{Option 2-3}

Figure 16:
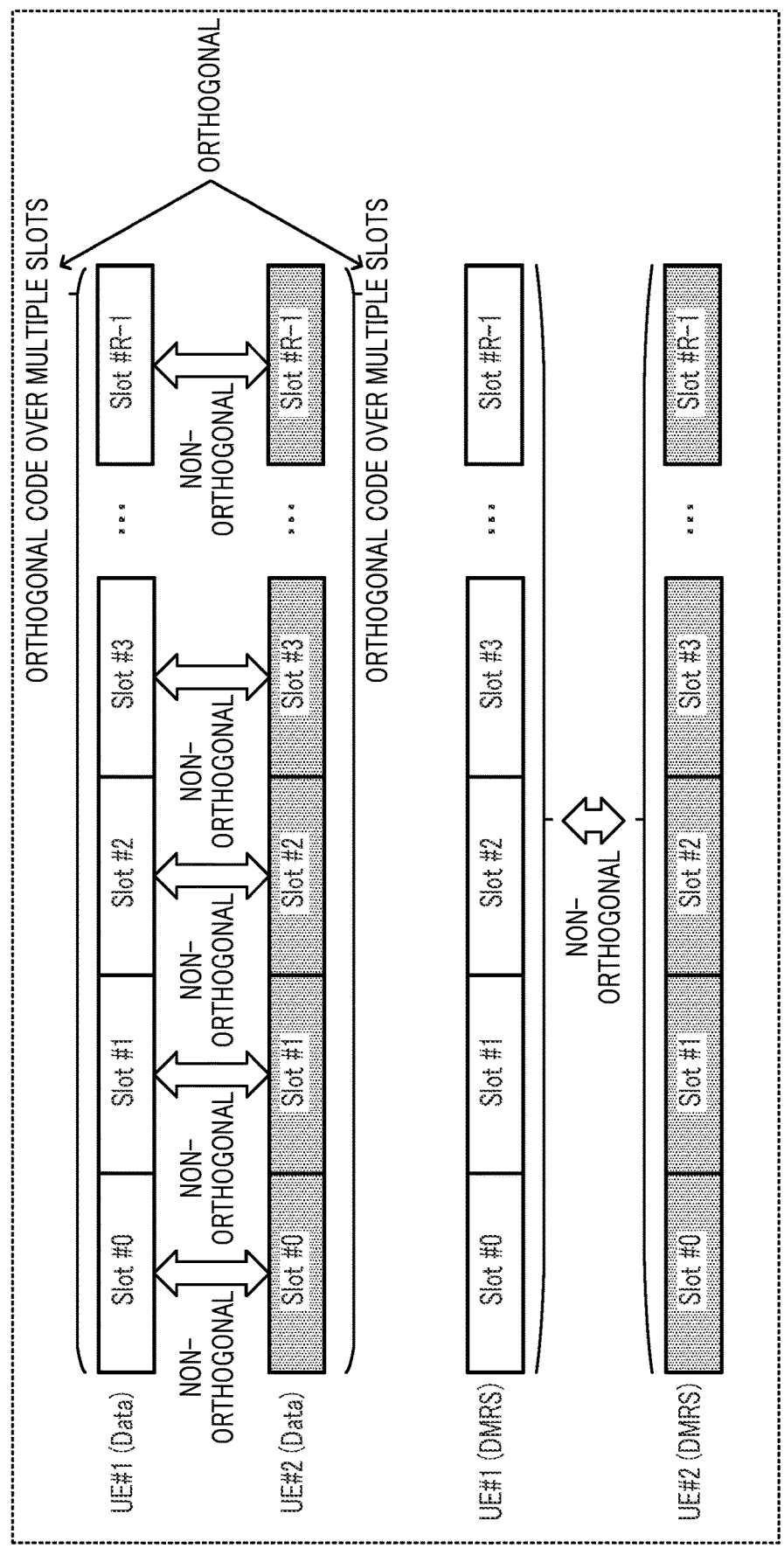
FIG. 16 is a diagram illustrating an example of generating the Repetition signal according to Option 2-3 of Embodiment 2.

In Option 2-3, the non-orthogonal multiple access is applied to the data signals. Further, in Option 2-3, as illustrated in FIG. 16, the data signals are non-orthogonal in a slot among the multiplexed terminals, and are orthogonal among slots among the multiplexed terminals, as described in Embodiment 1 (see, for example, FIG. 6).

That is, the reference signals are non-orthogonal among slots among the multiplexed terminals and the data signals are orthogonal among slots among the multiplexed terminals in Option 2-3. Thus, the combination of multiple accesses in a slot and among slots applied to the data signals and the combination of multiple accesses in a slot and among slots applied to the reference signals are different in Option 2-3.

In Option 2-3, the generation method of the data signals is similar to that in Embodiment 1, and the generation method of the reference signals is similar to that in Option 2-1 or Option 2-2.

Option 2-3 is suitable, for example, for the environment with high SNR or SINR. The application of Option 2-3 in the environment with high SNR or SINR improves the frequency utilization efficiency in uplink.

Further, in Option 2-3, the application of the orthogonal code over multiple slots to the data signals increases the number of the multiplexed terminals, as is the case with Embodiment 1, thereby reducing the increase in the computational complexity of the user detection, the demodulation processing or the like, while preventing the deterioration of the frequency utilization efficiency due to the Repetition.

[Option 3]

In Option 3, the non-orthogonal multiple access is applied to the reference signals. Further, in Option 3, the reference signals are non-orthogonal in a slot among the multiplexed terminals, and are orthogonal among slots among the multiplexed terminals, as described in Embodiment 1 (see, for example, FIG. 6).

In Option 3, the generation method of the reference signals is similar to the method described in Embodiment 1 (see, for example, FIG. 6).

Option 3 enables, for example, to reduce the increase in the computational complexity required for the user detection and the channel estimation for the reference signals as is the case with Embodiment 1, in addition to having the similar effects to Option 2.

Next, generation methods of the data signals in Option 3 (Option 3-1 to Option 3-3) will be described.

{Option 3-1}

In Option 3-1, the non-orthogonal multiple access is not applied to the data signals. In other words, the orthogonal multiple access is applied to the data signals in Option 3-1. Thus, the data signals are orthogonal among the multiplexed terminals both in a slot and among slots.

That is, the combination of multiple accesses in a slot and among slots applied to the data signals and the combination of multiple accesses in a slot and among slots applied to the reference signals are different from each other in Option 3-1.

Figure 17:
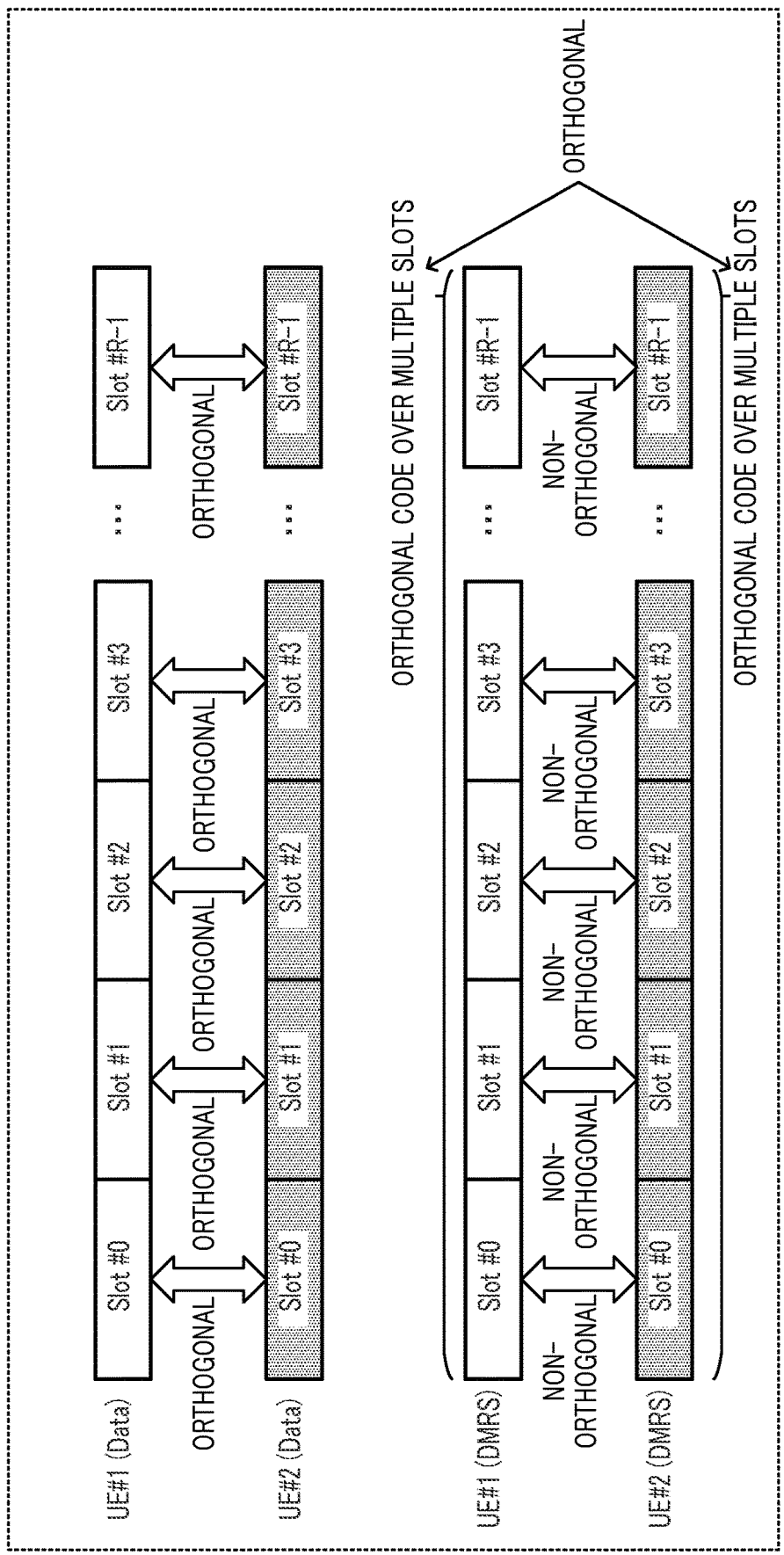
FIG. 17 is a diagram illustrating an example of generating the Repetition signal according to Option 3-1 of Embodiment 2.

For example, terminal 200 first generates the data signals for the orthogonal multiple access as is the case with the single slot allocation when the Repetition is applied to the data signals over multiple slots (e.g., R slots) as illustrated in FIG. 17. FDM, TDM, CDM, or the like may be applied to the signals for the orthogonal multiple access, for example.

Terminal 200 then multiplies, as illustrated in FIG. 17, the orthogonal code over multiple slots when the Repetition is applied to the generated slot-unit signals over multiple slots.

Option 3-1 enables to increase the number of the multiplexed terminals when, for example, the amount of orthogonal resources allocatable to the reference signals is sufficiently smaller than the amount of orthogonal resources allocatable to the data signals.

{Option 3-2}

In Option 3-2, the non-orthogonal multiple access is applied to the data signals. To be more specific, the data signals are non-orthogonal among the multiplexed terminals both in a slot and among slots in Option 3-2.

That is, the reference signals are orthogonal among slots among the multiplexed terminals and the data signals are non-orthogonal among slots among the multiplexed terminals in Option 3-2. Thus, the combination of multiple accesses in a slot and among slots applied to the data signals and the combination of multiple accesses in a slot and among slots applied to the reference signals are different in Option 3-2.

Figure 18:
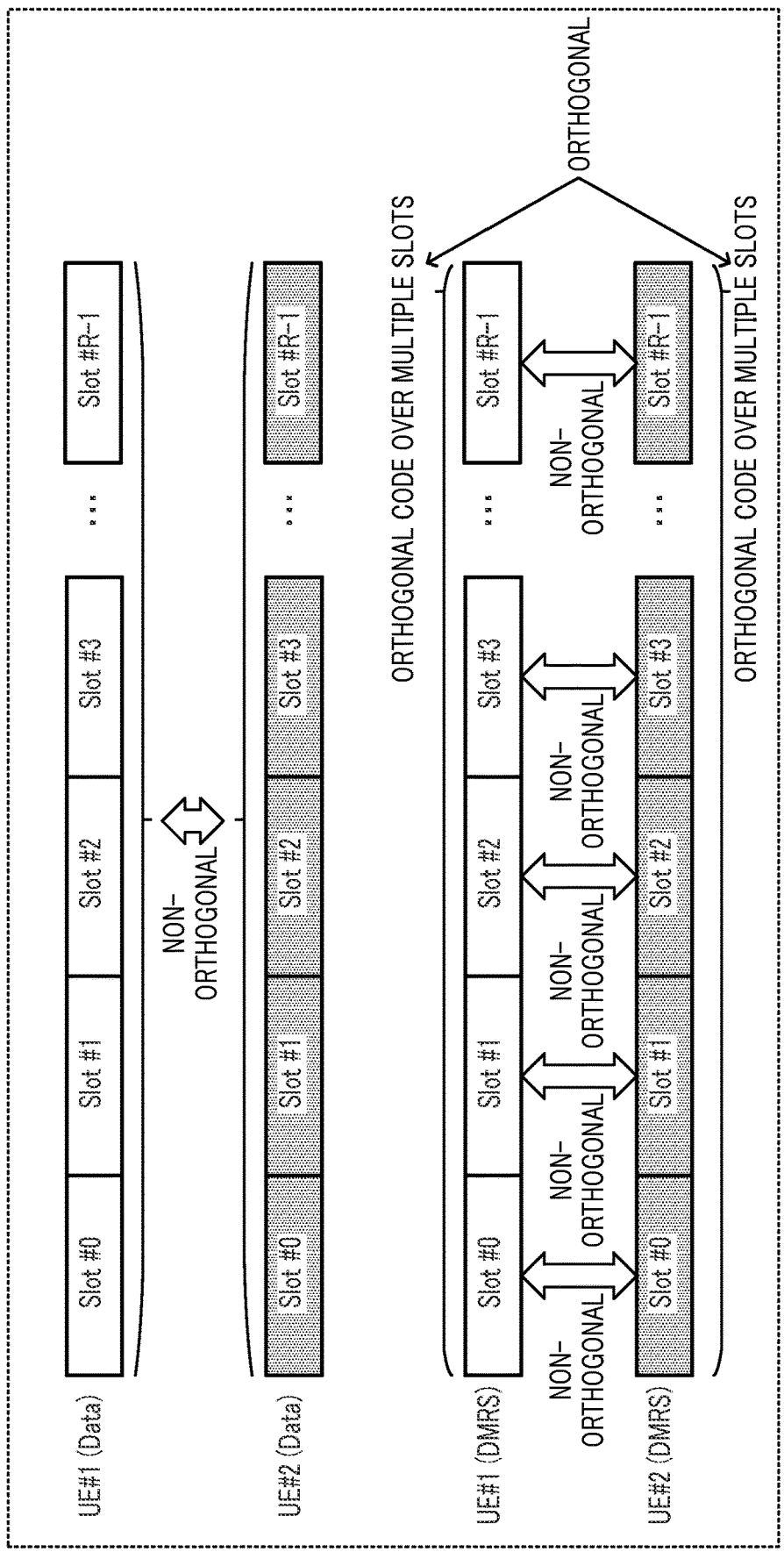
FIG. 18 is a diagram illustrating an example of generating the Repetition signal according to Option 3-2 of Embodiment 2.

When the Repetition is applied to the data signals over multiple slots, the number of the multiplexed terminals is increased by increasing the Signature size in the non-orthogonal multiple access according to the number of the Repetition as illustrated in FIG. 18. This prevents the frequency utilization efficiency for the data signals from deteriorating due to the Repetition.

Option 3-2 is suitable, for example, for the environment with high SNR or SINR. The application of Option 3-2 in the environment with high SNR or SINR improves the frequency utilization efficiency in uplink.

{Option 3-3}

Figure 19:
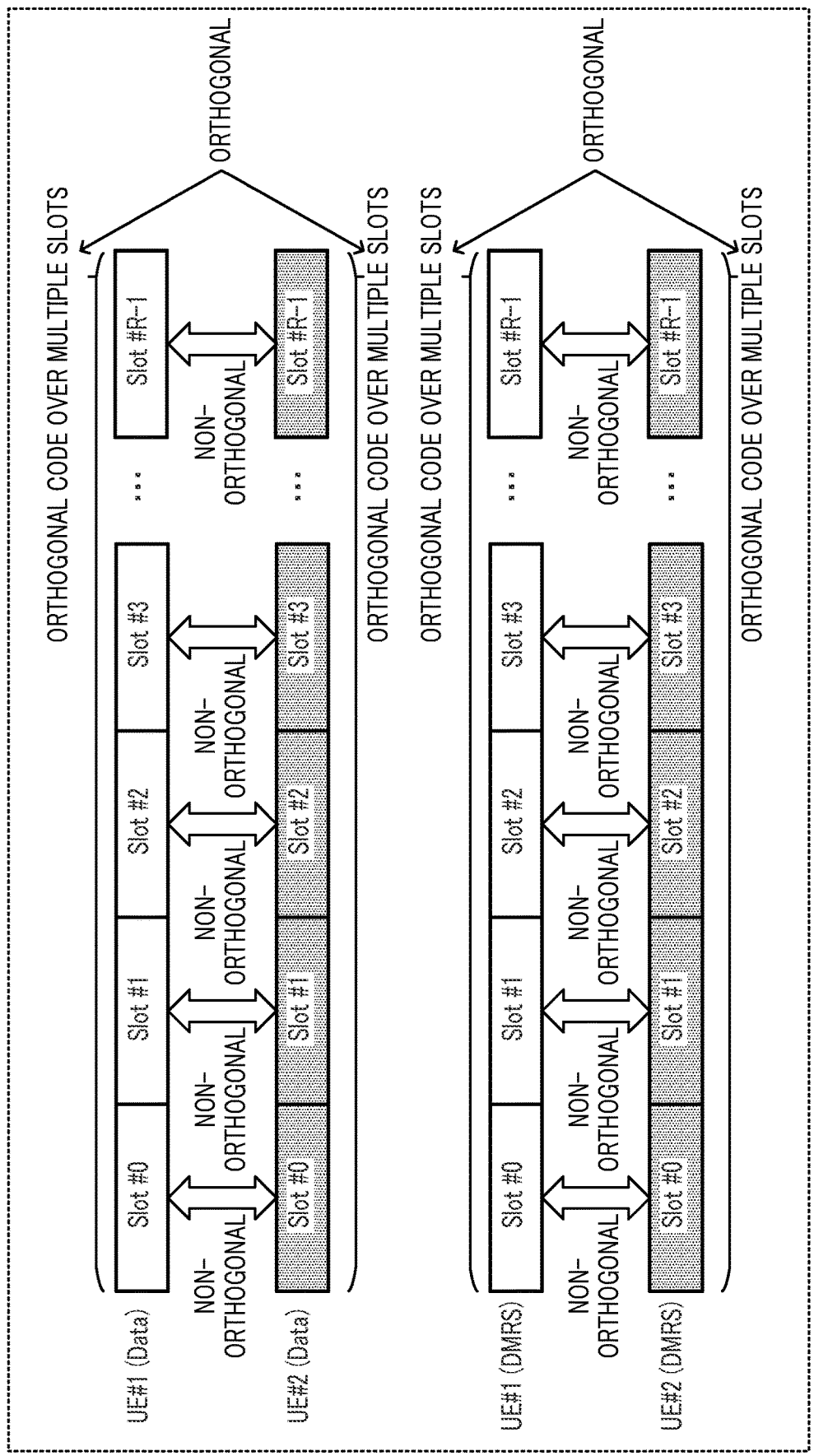
FIG. 19 is a diagram illustrating an example of generating the Repetition signal according to Option 3-3 of Embodiment 2.

In Option 3-3, the non-orthogonal multiple access is applied to the data signals. Further, in Option 3-3, as illustrated in FIG. 19, the data signals and the reference signals are non-orthogonal in a slot among the multiplexed terminals, and are orthogonal among slots among the multiplexed terminals, as described in Embodiment 1 (see, for example, FIG. 6).

That is, the combination of multiple accesses in a slot and among slots applied to the data signals and the combination of multiple accesses in a slot and among slots applied to the reference signals are the same in Option 3-3.

In Option 3-3, the generation method of the data signals is similar to the method described in Embodiment 1. Note that the generation method of the signals for the non-orthogonal multiple access and the orthogonal code over multiple slots may be the same for the data signals and the reference signals, or at least either one may be different from the other.

Option 3-3 is suitable, for example, for the environment with high SNR or SINR. The application of Option 3-3 in the environment with high SNR or SINR improves the frequency utilization efficiency in uplink.

Further, in Option 3-3, the application of the orthogonal code over multiple slots to the data signals increases the number of the multiplexed terminals, as is the case with Embodiment 1, thereby reducing the increase in the computational complexity of the user detection, or the demodulation processing, while preventing the deterioration of the frequency utilization efficiency due to the Repetition.

Options 1 to 3 have been described, thus far.

<Indication of Orthogonal and Non-orthogonal Multiple Access Method>

Next, descriptions will be given of the methods for indicating the multiple access methods of the data signals and the reference signals from base station 100 to terminal 200. This enables the receiving side (base station 100) and the transmitting side (terminal 200) to share which multiple access methods are used for the data signals and the reference signals.

Hereinafter, Option 1 and Option 2 will be described as examples of the methods for indicating the multiple access methods.

[Option 1]

In Option 1, the multiple access methods are dynamically indicated to terminal 200 using a DCI to be transmitted in a Physical Downlink Control Channel (PDCCH) that schedules uplink transmission.

In this case, the information to be indicated by the DCI may include information indicating both of a multiple access method in a slot unit and a multiple access method among slots, or may include information indicating the combination of the multiple access method in a slot unit and the multiple access method among slots.

Further, the DCI may separately indicate information indicating a multiple access method for data signals and information indicating a multiple access method for reference signals, or may indicate information indicating the combination of the multiple access methods for the data signals and the reference signals.

In addition, the multiple access methods to be indicated by the DCI may be any one of the candidates determined in advance by a standard, or any one of the candidates indicated by a cell-specific (or group-common) or UE-specific higher-layer signalling.

Further, the multiple access methods are not limited to being explicitly indicated by the DCI, and may be implicitly indicated by other information (parameters) to be indicated by the DCI. When the orthogonal code over multiple slots is used, for example, the multiple access methods may be implicitly determined from the indicated orthogonal code over multiple slots as in Embodiment 1. This enables to reduce the overhead for the indication of the multiple access methods.

[Option 2]

In Option 2, the multiple access methods are semi-statically indicated to terminal 200, using a cell-specific (or group-common) or UE-specific higher-layer signalling.

In this case, the information indicated by the higher-layer signalling may include information indicating a multiple access method in a slot unit and information indicating a multiple access method among slots, or may also include information indicating the combination of the multiple access method in a slot unit and the multiple access method among slots.

Further, the higher-layer signalling may separately indicate information indicating a multiple access method for data signals and information indicating a multiple access method for reference signals, or may indicate information indicating the combination of the multiple access methods for the data signals and the reference signals.

Further, the multiple access methods are not limited to being explicitly indicated by the higher-layer signalling, and may be implicitly indicated by other information (parameters) to be indicated by the higher-layer signalling. When the orthogonal code over multiple slots is used, for example, the multiple access methods may be implicitly determined from the indicated orthogonal code over multiple slots as in Embodiment 1. This enables to reduce the overhead for the indication of the multiple access methods.

The methods for indicating the multiple access methods have been described, thus far.

As described above, multiple access is each configured for the data signals and the reference signals (e.g., DMRSs) in the present embodiment.

For example, the combination of multiple accesses in a slot and among slots applied to the data signals and the combination of multiple accesses in a slot and among slots applied to the reference signals are different. Thus, the orthogonal multiple access is applicable to the reference signals to obtain a highly accurate channel estimate in the environment with low SNR or SINR, for example, and the non-orthogonal multiple access is applicable to the data signals to improve the frequency utilization efficiency.

The present embodiment therefore enables to increase the number of the multiplexed terminals and accurately demodulate the data signals in base station 100.

Note that, in the present embodiment, the configuration examples of multiple accesses for the data signals and the reference signals are not limited to the examples described in Option 1 to Option 3. Other multiple accesses may be applied, such as multiple accesses where at least either of the data signals and the reference signals is orthogonal in a slot among the multiplexed terminals and non-orthogonal among slots among the multiplexed terminals.

Embodiment 3

A base station and a terminal according to the present embodiment have the same basic configuration as base station 100 and terminal 200 according to Embodiment 1, and thus FIGS. 3 and 4 will be used for explanation.

Embodiment 1 has described the following processing in the case of applying Repetition over multiple slots. Terminal 200 as a transmission side, for example, first generates a signal for non-orthogonal multiple access as is the case with a single slot allocation, and then multiplies an orthogonal code over multiple slots when the Repetition is applied to the slot-unit signal over multiple slots, as illustrated in FIG. 20.

Further, in Embodiment 1, base station 100 as a receiving side performs a two-step processing of user detection and demodulation in order to reduce the increase in the computational complexity. The two steps include, for example, the user detection by despreading of the orthogonal code over multiple slots, and the user detection and the demodulation for the non-orthogonal multiple access of a combined single slot, as illustrated in FIG. 20.

Herein, the combination of the non-orthogonal multiple access applied for the single slot allocation and the orthogonal code over multiple slots can be regarded as a single non-orthogonal multiple access code sequence.

Figure 20:
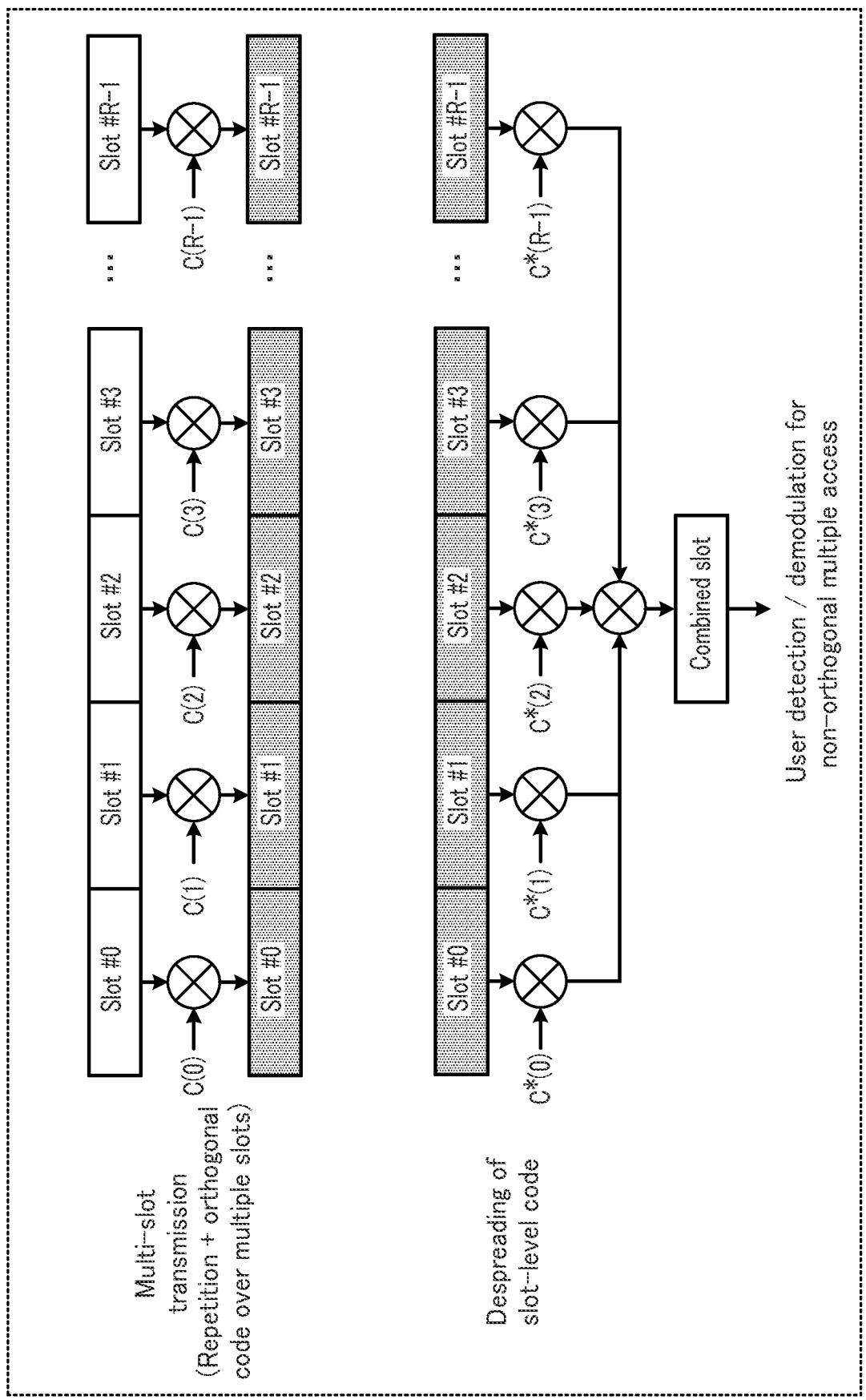
FIG. 20 is a diagram illustrating an example of user detection and demodulation processing (two-step processing) according to Embodiment 3.
Figure 21:
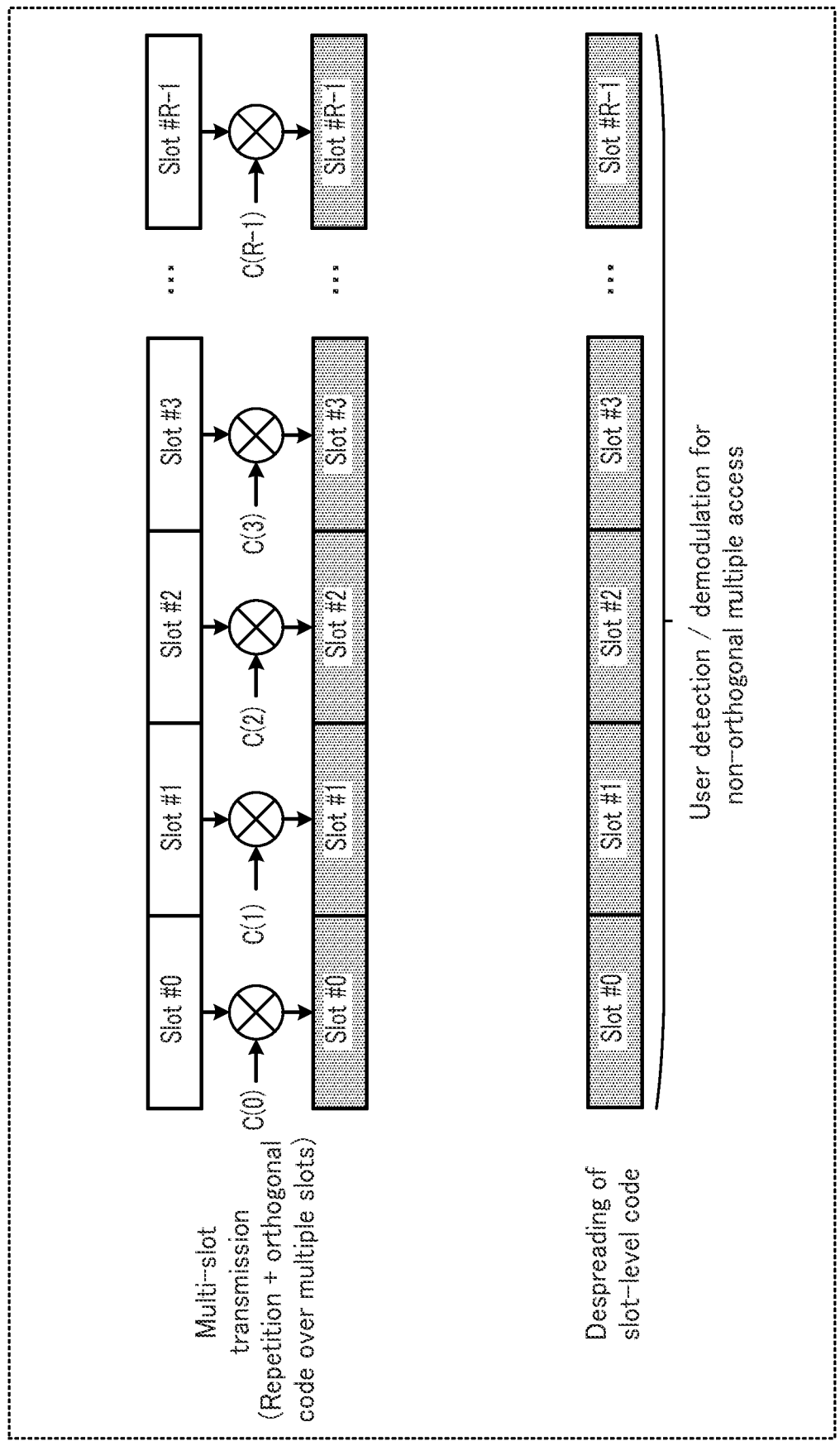
FIG. 21 is a diagram illustrating another example of user detection and demodulation processing (collective processing) according to Embodiment 3.

Thus, as illustrated in FIG. 21, base station 100 can also performs a joint processing of the user detection and the demodulation, for the Repetition signal generated in terminal 200 as in FIG. 20.

The advantages of performing the joint processing of the user detection and the demodulation as illustrated in FIG. 21 are that the diversity effects can be obtained by using multiple radio resources, particularly when the number of the multiplexed terminals is large, and the user detection performance can be improved. The joint processing of the user detection and the demodulation, however, has a risk of increasing the computational complexity of the user detection and the demodulation processing in base station 100.

Thus, in the present embodiment, base station 100 switches the methods of the user detection and the demodulation processing (between FIG. 20 and FIG. 21) according to the number of the multiplexed terminals, for example.

To be more specific, controller 101 of base station 100 determines the number of the multiplexed terminals in scheduling a plurality of terminals 200, and outputs the information indicating the number of the multiplexed terminals to user detector/demodulator 117.

When user detector/demodulator 117 of base station 100 receives a Repetition signal over multiple slots from a plurality of terminals 200, user detector/demodulator 117 switches between two methods according to the number of the multiplexed terminals in the Repetition signal. One of the two methods is the two-step processing (see, for example, FIG. 20) including reception processing (e.g., the user detection) by despreading of the orthogonal code over multiple slots, and reception processing (e.g., the user detection and the demodulation processing) based on the non-orthogonal multiple access of a single slot. The other method is the joint processing (see, for example, FIG. 21) of the user detection and the demodulation processing, regarding the combination of the non-orthogonal multiple access applied for the single slot allocation and the orthogonal code over multiple slots as a single non-orthogonal multiple access code sequence.

User detector/demodulator 117 may set the number of the multiplexed terminals X as a threshold, for example.

In this case, when X or less terminals 200 are multiplexed in a Repetition signal, user detector/demodulator 117 applies the two-step processing of the user detection and the demodulation processing as illustrated in FIG. 20. This prevents the increase in the computational complexity of the user detection and the demodulating processing in base station 100.

When more than X terminals 200 are multiplexed in a Repetition signal, however, user detector/demodulator 117 applies the joint processing of the user detection and the demodulation processing as illustrated in FIG. 21. This improves the user detection performance in base station 100.

In addition, the switching reference of the user detection and the demodulating processing is not limited to the number of the multiplexed terminals. For example, the switching criteria of the user detection and the demodulating processing may be a target transmission quality (e.g., a target block error rate).

A relatively high target error rate is configured for eMBB or mMTC, for example (e.g., the target block error rate of $10^{-1}$). User detector/demodulator 117 then applies the two-step processing of the user detection and the demodulation processing as illustrated in FIG. 20 for eMBB or mMTC (in other words, when the target block error rate is greater than the predetermined threshold). This makes it possible to avoid the increase in the computational complexity of the user detection and the demodulating processing in base station 100.

For URLLC, however, a relatively low target error rate is configured (e.g., a target block error rate of $10^{-5}$). User detector/demodulator 117 then applies the joint processing of the user detection and the demodulation processing as illustrated in FIG. 21 for URLLC (in other words, when the target block error rate is equal to or less than the predetermined threshold). This improves the user detection performance in base station 100.

Each embodiment of the present disclosure has been described, thus far.

Note that the above embodiments can be applied to any uplink transmission waveforms. The uplink transmission waveform may be OFDM or DFT-s-OFDM, for example.

In addition, the operations in a slot unit used in the embodiments described above can be applied by replacing the slot unit with a subframe unit, a symbol unit, a resource element (RE) unit, or other allocation units such as a resource unit. For example, a slot is a time resource unit including 14 symbols in NR. Meanwhile, a subframe is a time resource unit including 14 symbols in LTE. Further, a resource unit is a set of time/frequency resources configured by a plurality of slots, a plurality of subframes, a plurality of symbols, or a plurality of REs.

Incidentally, although the cases of using the Repetition in a slot unit have been described in the above embodiments, the unit of the Repetition is not limited to the unit of slots, and may be other allocation units. For example, the unit of the Repetition may be any of a subframe unit, a symbol unit, an RE unit, and a resource unit, or may be any combinations thereof. In this case, the orthogonal code over multiple slots may be replaced with an orthogonal code sequence over subframes, symbols, REs, or resource units respectively, depending on the unit of the Repetition.

Further, the Signature for generating signals for the non-orthogonal multiple access is not limited to spreading codes or codebooks, and only needs to have characteristics for distinguishing a plurality of terminals. For example, Signature may be represented by radio resources or power.

The following methods can be applied to the generation of signals for the non-orthogonal multiple access in an embodiment of the present disclosure: Power Domain Non-Orthogonal Multiple Access (PD-NOMA) (e.g., see NPL7), Sparse Code Multiple Access (SCMA) (e.g., see NPL8), Multi-User Shared Access (MUSA) (e.g., see NPL9), Pattern Division Multiple Access (PDMA) (e.g., see NPL10), Low code rate and Signature based Shared Access (LSSA) (e.g., see NPL11), Resource Spread Multiple Access (RSMA) (e.g., see NPL12), Interleave-Grid Multiple Access (IGMA) (e.g., see NPL13), Interleaver Division Multiple Access (IDMA) (e.g., see NPL14), Non-orthogonal Coded Multiple Access (NCMA) (e.g., see NPL15), Non-orthogonal Coded Access (NOCA) (e.g., see NPL16), Group Orthogonal Coded Access (GOCA) (e.g., see NPL17), Repetition Division Multiple Access (RDMA) (e.g., see NPL17), LDS-Signature Vector Extension (LDS-SVE) (e.g., see NPL18), Frequency Domain Spreading (FDS) (e.g., see NPL19), and Low Code Rate Spreading (LCRS) (e.g., see NPL19). Note that the non-orthogonal multiple access method is not limited to the above methods, and may be any multiple access methods where the radio resources allocated to a plurality of multiplexed terminals are not orthogonal with each other in a time domain, a frequency domain, or a code domain.

The present disclosure can be realized by software, hardware, or software in cooperation with hardware. Each functional block used in the description of each embodiment described above can be partly or entirely realized by an LSI such as an integrated circuit, and each process described in each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI herein may be referred to as an IC, a system LSI, a super LSI, or an ultra LSI depending on a difference in the degree of integration. However, the technique of implementing an integrated circuit is not limited to the LSI and may be realized by using a dedicated circuit, a general-purpose processor, or a special-purpose processor. In addition, a Field Programmable Gate Array (FPGA) that can be programmed after the manufacture of the LSI or a reconfigurable processor in which the connections and the settings of circuit cells disposed inside the LSI can be reconfigured may be used. The present disclosure can be realized as digital processing or analogue processing. If future integrated circuit technology replaces LSIs as a result of the advancement of semiconductor technology or other derivative technology, the functional blocks could be integrated using the future integrated circuit technology. Biotechnology can also be applied.

The present disclosure can be implemented in apparatuses, devices, and systems of any kind, each being provided with a communication function, (collectively referred to as "communication apparatuses"). Non-limiting examples of the communication apparatuses include telephones (such as portable phones and smartphones), tablets, personal computers (PCs) (such as laptops, desktops, and notebooks), cameras (such as digital still/video cameras), digital players (such as digital audio/video players), wearable devices (such as wearable cameras, smartwatches, and tracking devices), game consoles, digital book readers, telehealth telemedicine (remote healthcare medicine prescription) devices, communication-function-equipped vehicles or transportation (such as automobiles, airplanes and ships), and a combination of the above mentioned apparatuses of various kinds.

The communication apparatuses are not limited to portable or mobile apparatuses and thus include unportable or fixed apparatuses, devices, and systems of any kind, such as smart home devices (e.g., appliances, lighting equipment, smart meters or measuring instruments, and control panels), vending machines, and every "things" that may exist on Internet of Things (IoT) networks.

In addition to data communication via cellular systems, wireless LAN systems, communication satellite systems and/or the like, communication includes data communication via a combination of these systems.

Moreover, the communication apparatuses include devices, such as controllers or sensors to be connected to or linked to a communication device which executes communication functions described in the present disclosure. Controllers or sensors are included, for example, each of which is configured to generate a control signal and/or a data signal used by the communication device which executes the communication functions of the communication apparatuses.

Further, the communication apparatuses include infrastructure equipment which performs communication with the above-mentioned non-limiting apparatuses of various kinds or which controls these non-limiting apparatuses of various kinds, such as base stations, access points, apparatuses of any other kinds, devices, and systems.

A base station according to the present disclosure includes: a receiver, which in operation, receives a transmission signal to be repeatedly transmitted over a plurality of allocation units; and circuitry, which, in operation, demodulates the transmission signal based on a combination of non-orthogonal multiple access where signals of a plurality of terminals are not orthogonal with each other, and orthogonal multiple access where signals of a plurality of terminals are orthogonal with each other.

In the base station according to the present disclosure, the transmission signal is a signal resulting from multiplication of a signal generated in a single one of the allocation units based on the non-orthogonal multiple access, by a code sequence of the orthogonal multiple access in each of the plurality of allocation units.

In the base station according to the present disclosure, a sequence length of the code sequence has a same value as a number of the plurality of allocation units.

In the base station according to the present disclosure, a sequence length of the code sequence has a smaller value than a number of the plurality of allocation units.

In the base station according to the present disclosure, the code sequence is dynamically indicated to a terminal, using a downlink control signal.

In the base station according to the present disclosure, the code sequence to be indicated using the downlink control signal is any one of a plurality of candidates for the code sequence.

In the base station according to the present disclosure, the plurality of candidates have been indicated by higher-layer signaling, or determined in advance.

In the base station according to the present disclosure, the code sequence is associated with another parameter to be indicated to the terminal by the downlink control signal.

In the base station according to the present disclosure, the code sequence is indicated to a terminal, using higher-layer signaling.

In the base station according to the present disclosure, the code sequence is associated with another parameter to be indicated to the terminal by the higher-layer signaling.

In the base station according to the present disclosure, the transmission signal includes a data signal and a reference signal, and the combination to be applied to the data signal and the combination to be applied to the reference signal are different from each other.

In the base station according to the present disclosure, the circuitry switches between a first method and a second method in accordance with a number of terminals multiplexed in the received transmission signal, the first method performing, in two steps, first reception processing by despreading using the code sequence, and second reception processing based on the non-orthogonal multiple access in the single allocation units, and the second method performing the first processing and the second processing jointly.

In the base station according to the present disclosure, the circuitry switches between a first method and a second method in accordance with a target transmission quality of the transmission signal, the first method performing, in two steps, first reception processing by despreading using the code sequence, and second reception processing based on the non-orthogonal multiple access in the single allocation unit, and the second method performing the first processing and the second processing jointly.

A terminal according to the present disclosure includes: circuitry, which, in operation, generates a transmission signal to be repeatedly transmitted over a plurality of allocation units based on a combination of non-orthogonal multiple access where signals of a plurality of terminals are not orthogonal with each other, and orthogonal multiple access where signals of a plurality of terminals are orthogonal with each other; and a transmitter, which in operation, transmits the transmission signal.

A reception method according to the present disclosure includes: receiving a transmission signal to be repeatedly transmitted over a plurality of allocation units; and demodulating the transmission signal based on a combination of non-orthogonal multiple access where signals of a plurality of terminals are not orthogonal with each other, and orthogonal multiple access where signals of a plurality of terminals are orthogonal with each other.

A transmission method according to the present disclosure includes: generating a transmission signal to be repeatedly transmitted over a plurality of allocation units based on a combination of non-orthogonal multiple access where signals of a plurality of terminals are not orthogonal with each other, and orthogonal multiple access where signals of a plurality of terminals are orthogonal with each other; and transmitting the transmission signal.

The disclosure of Japanese Patent Application No. 2018-119672, filed on Jun. 25, 2018, including the specification, drawings, and abstract is incorporated herein by reference in its entirety.

INDUSTRIAL APPLICABILITY

One exemplary embodiment of the present disclosure is useful in mobile communication systems.

REFERENCE SIGNS LIST

100 Base station
101, 209 Controller
102 Higher-layer control signal generator
103, 106, 211 Encoder
104, 107, 212 Modulator
105 Downlink control signal generator
108, 214 Signal assigner
109, 215 Inverse Fast Fourier Transformer (IFFT)
110, 216 Transmitter
111, 201 Antenna
112, 202 Receiver
113, 203 Fast Fourier Transformer (FFT)
114 Received signal processor
115, 204 Extractor
116 Channel estimator
117 User detector/Demodulator
118 Decoder
119 Determiner
200 Terminal
205 Downlink control signal demodulator
206, 208 Decoder
207 Higher-layer control signal demodulator
210 Signal generator
213 Reference signal generator

The invention claimed is:

1. A base station, comprising:
a receiver, which in operation, receives a transmission signal to be repeatedly transmitted over a plurality of allocation units; and
circuitry, which, in operation, demodulates the transmission signal based on a combination of non-orthogonal multiple access in which signals of a plurality of terminals are not orthogonal to each other, and orthogonal multiple access in which signals of the plurality of terminals are orthogonal to each other, wherein:
the transmission signal includes a data signal and a reference signal,
the combination to be applied to the data signal and the combination to be applied to the reference signal are different from each other,
the non-orthogonal multiple access is applied to the data signal,
the orthogonal multiple access is applied to the reference signal,
the transmission signal is a signal resulting from multiplication of a signal generated in a single one of the plurality of allocation units based on the non-orthogonal multiple access, by a code sequence of the orthogonal multiple access in each of the plurality of allocation units, and
the code sequence is dynamically indicated to a terminal, using a downlink control signal.

2. The base station according to claim 1, wherein a sequence length of the code sequence has a same value as a number of the plurality of allocation units.

3. The base station according to claim 1, wherein a sequence length of the code sequence has a smaller value than a number of the plurality of allocation units.

4. The base station according to claim 1, wherein the code sequence to be indicated using the downlink control signal is any one of a plurality of candidates for the code sequence.

5. The base station according to claim 4, wherein the plurality of candidates are indicated by higher-layer signaling, or determined in advance.

6. The base station according to claim 1, wherein the code sequence is associated with another parameter to be indicated to the terminal by the downlink control signal.

7. The base station according to claim 1, wherein the code sequence is indicated to a terminal, using higher-layer signaling.

8. The base station according to claim 7, wherein the code sequence is associated with another parameter to be indicated to the terminal by the higher-layer signaling.

9. A base station, comprising:
a receiver, which in operation, receives a transmission signal to be repeatedly transmitted over a plurality of allocation units; and
circuitry, which, in operation, demodulates the transmission signal based on a combination of non-orthogonal multiple access in which signals of a plurality of terminals are not orthogonal to each other, and orthogonal multiple access in which signals of the plurality of terminals are orthogonal to each other, wherein
the transmission signal is a signal resulting from multiplication of a signal generated in a single one of the plurality of allocation units based on the non-orthogonal multiple access, by a code sequence of the orthogonal multiple access in each of the plurality of allocation units, and
the circuitry, in operation, switches between a first method and a second method in accordance with a number of terminals multiplexed in the received transmission signal, the first method including performing, in two steps, first reception processing by despreading using the code sequence, and second reception processing based on the non-orthogonal multiple access in single allocation units, and the second method including performing the first reception processing and the second reception processing jointly.

10. A base station, comprising:
a receiver, which in operation, receives a transmission signal to be repeatedly transmitted over a plurality of allocation units; and
circuitry, which, in operation, demodulates the transmission signal based on a combination of non-orthogonal multiple access in which signals of a plurality of terminals are not orthogonal to each other, and orthogonal multiple access in which signals of the plurality of terminals are orthogonal to each other, wherein:
the transmission signal is a signal resulting from multiplication of a signal generated in a single one of the plurality of allocation units based on the non-orthogonal multiple access, by a code sequence of the orthogonal multiple access in each of the plurality of allocation units, and
the circuitry, in operation, switches between a first method and a second method in accordance with a target transmission quality of the transmission signal, the first method including performing, in two steps, first reception processing by despreading using the code sequence, and second reception processing based on the non-orthogonal multiple access in single allocation unit, and the second method including performing the first reception processing and the second reception processing jointly.

11. A terminal, comprising:
circuitry, which, in operation, generates a transmission signal to be repeatedly transmitted over a plurality of allocation units based on a combination of non-orthogonal multiple access in which signals of a plurality of terminals are not orthogonal to each other, and orthogonal multiple access in which signals of the plurality of terminals are orthogonal to each other; and
a transmitter, which in operation, transmits the transmission signal, wherein:
the transmission signal includes a data signal and a reference signal,
the combination to be applied to the data signal and the combination to be applied to the reference signal are different from each other,
the non-orthogonal multiple access is applied to the data signal,
the orthogonal multiple access is applied to the reference signal,
the transmission signal is a signal resulting from multiplication of a signal generated in a single one of the plurality of allocation units based on the non-orthogonal multiple access, by a code sequence of the orthogonal multiple access in each of the plurality of allocation units, and
the code sequence is dynamically indicated to a terminal, using a downlink control signal.

12. A reception method, comprising:
receiving a transmission signal to be repeatedly transmitted over a plurality of allocation units; and
demodulating the transmission signal based on a combination of non-orthogonal multiple access in which signals of a plurality of terminals are not orthogonal to each other, and orthogonal multiple access in which signals of the plurality of terminals are orthogonal to each other, wherein
the transmission signal includes a data signal and a reference signal,
the combination to be applied to the data signal and the combination to be applied to the reference signal are different from each other,
the non-orthogonal multiple access is applied to the data signal,
the orthogonal multiple access is applied to the reference signal,
the transmission signal is a signal resulting from multiplication of a signal generated in a single one of the plurality of allocation units based on the non-orthogonal multiple access, by a code sequence of the orthogonal multiple access in each of the plurality of allocation units, and
the code sequence is dynamically indicated to a terminal, using a downlink control signal.

13. A transmission method, comprising:
generating a transmission signal to be repeatedly transmitted over a plurality of allocation units based on a combination of non-orthogonal multiple access in which signals of a plurality of terminals are not orthogonal to each other, and orthogonal multiple access in which signals of the plurality of terminals are orthogonal to each other; and
transmitting the transmission signal, wherein
the transmission signal includes a data signal and a reference signal,
the combination to be applied to the data signal and the combination to be applied to the reference signal are different from each other,
the non-orthogonal multiple access is applied to the data signal,
the orthogonal multiple access is applied to the reference signal, the transmission signal is a signal resulting from multiplication of a signal generated in a single one of the plurality of allocation units based on the non-orthogonal multiple access, by a code sequence of the orthogonal multiple access in each of the plurality of allocation units, and the code sequence is dynamically indicated to a terminal, using a downlink control signal.

\* \* \* \* \*